(12) United States Patent
Ward et al.

(10) Patent No.: US 9,429,923 B2
(45) Date of Patent: Aug. 30, 2016

(54) HVAC CONTROL SYSTEM AND METHOD

(75) Inventors: John Ward, New South Wales (AU);
Joshua Wall, New South Wales (AU);
Glenn Platt, New South Wales (AU)

(73) Assignee: Commonwealth Scientific and Industrial Research Organisation, Australian Capital Territory (AU)

(*) Notice: Subject to any disclaimer, the term of this patent is extended or adjusted under 35 U.S.C. 154(b) by 939 days.

(21) Appl. No.: 13/515,644

(22) PCT Filed: Dec. 15, 2010

(86) PCT No.: PCT/AU2010/001691
§ 371 (c)(1),
(2), (4) Date: Jun. 13, 2012

(87) PCT Pub. No.: WO2011/072332
PCT Pub. Date: Jun. 23, 2011

(65) Prior Publication Data
US 2012/0259469 A1    Oct. 11, 2012

(30) Foreign Application Priority Data

Dec. 16, 2009 (AU) ................................ 2009906122

(51) Int. Cl.
*G05B 15/02* (2006.01)
*G05D 23/19* (2006.01)
*F24F 11/00* (2006.01)

(52) U.S. Cl.
CPC ............ *G05B 15/02* (2013.01); *G05D 23/1917* (2013.01); *F24F 2011/0057* (2013.01); *F24F 2011/0091* (2013.01); *G05B 2219/2642* (2013.01)

(58) Field of Classification Search
CPC .......... G05B 15/02; G05B 2219/2642; G05B 13/02; G05B 13/0265; G05B 13/04; G05B 13/041; G05B 13/042; G05B 13/047; G05D 23/1917; F24F 2011/0057; F24F 2011/0091
See application file for complete search history.

(56) References Cited

U.S. PATENT DOCUMENTS 5,115,967 A    5/1992  Wedekind
5,801,940 A    9/1998  Russ et al.
(Continued)

FOREIGN PATENT DOCUMENTS

GB    2 408 592 A    1/2005
GB    2 448 896 A    5/2008
(Continued)

OTHER PUBLICATIONS

John Ward, Joshua Wall, Sam West, Richard de Dear, Beyond Comfort—Managing the Impact of HVAC Control on the Outside World, Proceedings of Conference: Air Conditioning and the Low Carbon Cooling Challenge, Jul. 27-29, 2008.*
First Office Action and Search Report for Application No. 2010800640718, Aug. 5, 2014, 16 pages.
European Search Report and Written opinion dated Aug. 21, 2013 for corresponding European Application No. 10836843.2, 7 pages.
Japanese Written Opinion and Translation dated Apr. 22, 2014 for corresponding Japanese Application No. 2012-543414, 13 pages.

*Primary Examiner* — Mohammad Ali
*Assistant Examiner* — Nathan L Laughlin
(74) *Attorney, Agent, or Firm* — Brinks Gilson & Lione

(57) ABSTRACT

A method of controlling the heating, ventilation and air conditioning (HVAC) system of a building, the method comprising the steps of: (a) developing an initial thermal model of the building, and continuously updating the thermal model over time; (b) utilising the thermal model to continuously develop a daily HVAC operating plan for the building; and (c) continuously examining a current HVAC operating plan and optimising the alignment of the current HVAC operation with the current HVAC operating plan.

10 Claims, 14 Drawing Sheets

(56) References Cited

U.S. PATENT DOCUMENTS

| | | |
|---|---|---|
| 6,185,483 B1 | 2/2001 | Drees |
| 7,216,021 B2 | 5/2007 | Matsubara et al. |
| 2004/0238653 A1* | 12/2004 | Alles .................... 236/49.3 |
| 2005/0040247 A1* | 2/2005 | Pouchak .................. 236/44 C |
| 2005/0096797 A1 | 5/2005 | Matsubara et al. |
| 2005/0171645 A1 | 8/2005 | Oswald et al. |
| 2005/0192915 A1* | 9/2005 | Ahmed et al. ................ 706/21 |
| 2007/0228183 A1 | 10/2007 | Kennedy et al. |
| 2009/0005912 A1 | 1/2009 | Srivastava et al. |
| 2010/0106332 A1* | 4/2010 | Chassin et al. ............... 700/278 |
| 2011/0106328 A1* | 5/2011 | Zhou et al. .................... 700/291 |

FOREIGN PATENT DOCUMENTS

| | | |
|---|---|---|
| JP | 2002-206785 | 7/2002 |
| JP | 2002206785 | 7/2002 |
| JP | 2003084805 | 3/2003 |
| JP | 5005158020 | 6/2005 |
| JP | 2006266520 | 10/2006 |
| WO | WO 2006/055334 A1 | 5/2006 |

* cited by examiner

HVAC CONTROL SYSTEM AND METHOD

This application is a National Stage of International Application No. PCT/AU2010/001691 filed on Dec. 15, 2010, which claims priority to Australian Patent Application No. 2009906122 filed on Dec. 16, 2009, the entirety of both hereby incorporated by reference.

FIELD OF THE INVENTION

The present invention relates to an efficient system and method for Heating, Ventilating and Air conditioning (HVAC) of a building. In particular, the present invention provides to a more efficient climate control system for use in buildings.

BACKGROUND

The widespread deployment of heating, ventilation and air-conditioning (HVAC) systems has added significant flexibility to building design and form. It has provided indoor comfort even in severe climatic conditions and served to make habitable buildings with poor thermal performance. This flexibility has not, however, been without its costs. For example, in Australia, HVAC typically accounts for over 60% of energy use in commercial buildings [Australian Greenhouse Office, 1999], and is a substantial contributor to greenhouse gas emissions and is driving demand in the electricity network.

There is considerable research being carried out into optimal HVAC control strategies. These have considered aspects of comfort, electricity network interactions, and greenhouse gas emissions, though typically in isolation. For example, Braun et al. (1990, 2001) has investigated using building thermal mass for energy load shaping, Eto (2007) has demonstrated the use of air-conditioning to provide spinning reserve to the electricity network, Fanger (19617) pioneered research on thermal comfort, and the effects of thermal comfort on productivity have more recently been investigated by Seppänen et al. (2006). Greenhouse gas emissions have typically been achieved as part of overall energy savings strategies, though cogeneration systems (e.g. White and Ward (2006)) have directly exploited waste heat and fuel substitution to reduce emissions.

HVAC control systems typically use temperature as their control setpoint throughout a commercial building. The HVAC plant, including valve and damper positions, fan speeds, and so on are controlled in order to achieve a given setpoint temperature. Typically, this setpoint temperature is fixed, although state of the art HVAC systems may vary temperature based on a load shedding request.

SUMMARY

It is an object of the present invention to provide an improved form of HVAC control system having a number of desirable features.

In accordance with a first aspect of the present invention, there is provided a method of controlling the heating, ventilation and air conditioning (HVAC) system of a building, the method comprising the steps of: (a) developing an initial thermal model of the building, and continuously updating this thermal model over time; (b) utilising the thermal model to continuously develop a daily HVAC operating plan for the building; and (c) continuously examining the current HVAC operating plan and optimising the alignment of the current HVAC operation with this plan.

The thermal model utilises a series of parameters, fitted to historical thermal data for the building. The thermal model can be a piecewise polynomial model. The initial thermal model can be iteratively updated substantially daily. The daily operating plan is an optimisation of a combination of operator preferences that includes user comfort, power consumption and power costs. External inputs beyond operator preferences that drive the operating plan include electricity pricing data, weather forecasts and occupant comfort satisfaction data. The daily HVAC operating plan can be recalculated substantially every 5 minutes. Optimising the alignment of HVAC operation with the current HVAC operating plan can be attempted substantially every 10 seconds.

In accordance with a further aspect of the present invention, there is provided a method of controlling the heating, ventilation and air conditioning (HVAC) system of a building, the method comprising the steps of: (a) determining a thermal model for the building; (b) determining an expected human comfort model for users of the building; (c) utilising the expected human comfort model as the prime factor in calculating a HVAC operating plan of the building.

The human comfort model can be augmented with personal comfort data of users of the commercial building by means of data feed back by users of the commercial building. The human comfort model can be derived from the ASHRAE standard comfort models.

The thermal model in one embodiment has the following form:

$$T_{int}(z) = F_{amb}(z)T_{amb}(z) - \frac{10}{P_{coolTyp}}F_{Pcool}(z)P_{cool}(z) + \frac{1}{P_{heatTyp}}F_{Pheat}(z)P_{heat}(z) + B(z)$$

where: $T_{int}(z)$ is the average internal building temperature; $T_{amb}(z)$ is the ambient temperature; $P_{cool}(z)$ is the HVAC cooling power consumption;

$P_{coolTyp}$ is the typical HVAC cooling power consumption; it is used in (1) as a scaling factor to get the magnitude of the parameters of $F_{Pcool}(z)$ in the same ball park as other parameters; also it provides a normalization mechanism that allows for operation on different BMS systems—this is particularly important with respect to optimization constraints $P_{heat}(z)$ is the HVAC heating power consumption $P_{heatTyp}$ is the typical HVAC heating power consumption; it is used in (1) as a scaling factor to get the magnitude of the parameters of $F_{Pheat}(z)$ in the same ball park as other parameters; also it provides a normalization mechanism that allows for operation on different BMS systems—this is particularly important with respect to optimization constraints $F_{amb}(z)$ captures the internal building temperature response to ambient temperature $F_{Pcool}(z)$ captures the internal building temperature response to HVAC cooling power $F_{Pheat}(z)$ captures the internal building temperature response to HVAC heating power B(z), "baseline", captures factors other than those captured by $F_{amb}(z)$, $F_{Pcool}(z)$ and $F_{Pheat}(z)$ 10 is a scaling factor used to get the magnitude of the parameters of $F_{Pcool}(z)$ in the same ball park as other parameters; this number was an arbitrary choice.

In other embodiments, the thermal model can have substantially the following form:

$$T_z = F_A(s) \cdot T_{Amb} + \text{BaselineFcn} - F_T(s) \cdot \Delta T_{SS}$$

where: $T_z$ is (modelled) aggregate zone temperature; $T_{Amb}$ is the outside (Ambient) air temperature; $\Delta T_{SS}$ is the steady state difference in zone temperature that would result from the current HVAC cooling and heating powers; BaselineFcn is a learnt function of time, accounting for people, equipment, sun, etc; $F_A(s)$ and $F_T(s)$ are linear time invariant filters, accounting for the system dynamics.

Ideally $\Delta T_{SS}$ has the form:

$$\Delta T_{SS} = \alpha_c \cdot \mu_c \cdot \max\{0, P_{Cool} - P_{cb}\} - \alpha_h \cdot \mu_h \cdot \max\{0, P_{Heat} - P_{hb}\}$$

where the first part of the equation is the effective cooling temperature ($\Delta T_{Cool}$), the second part is the effective heating temperature ($\Delta T_{Heat}$), and the parameters are: $P_{Cool}$ and $P_{Heat}$ are estimates of actual cooling and heating powers respectively (kW); $P_{cb}$ and $P_{hb}$ are baseline cooling and heating powers respectively (kW); $\alpha_c$ and $\alpha_h$ are nominal scaling for HVAC power effectiveness (° C./kW); and $\mu_c$ and $\mu_h$ are HVAC efficiency de-ratings as a function of external temperature.

In the above preferred form, the baseline function preferably changes depending on the current day of the week. More preferably, the baseline function is formed of a to combination of triangular basis functions that are estimated at specific fixed points throughout a day.

BRIEF DESCRIPTION OF THE DRAWINGS

Benefits and advantages of the present invention will become apparent to those skilled in the art to which this invention relates from the subsequent description of exemplary embodiments and the appended claims, taken in conjunction with the accompanying drawings, in which:

DETAILED DESCRIPTION

Figure 1:
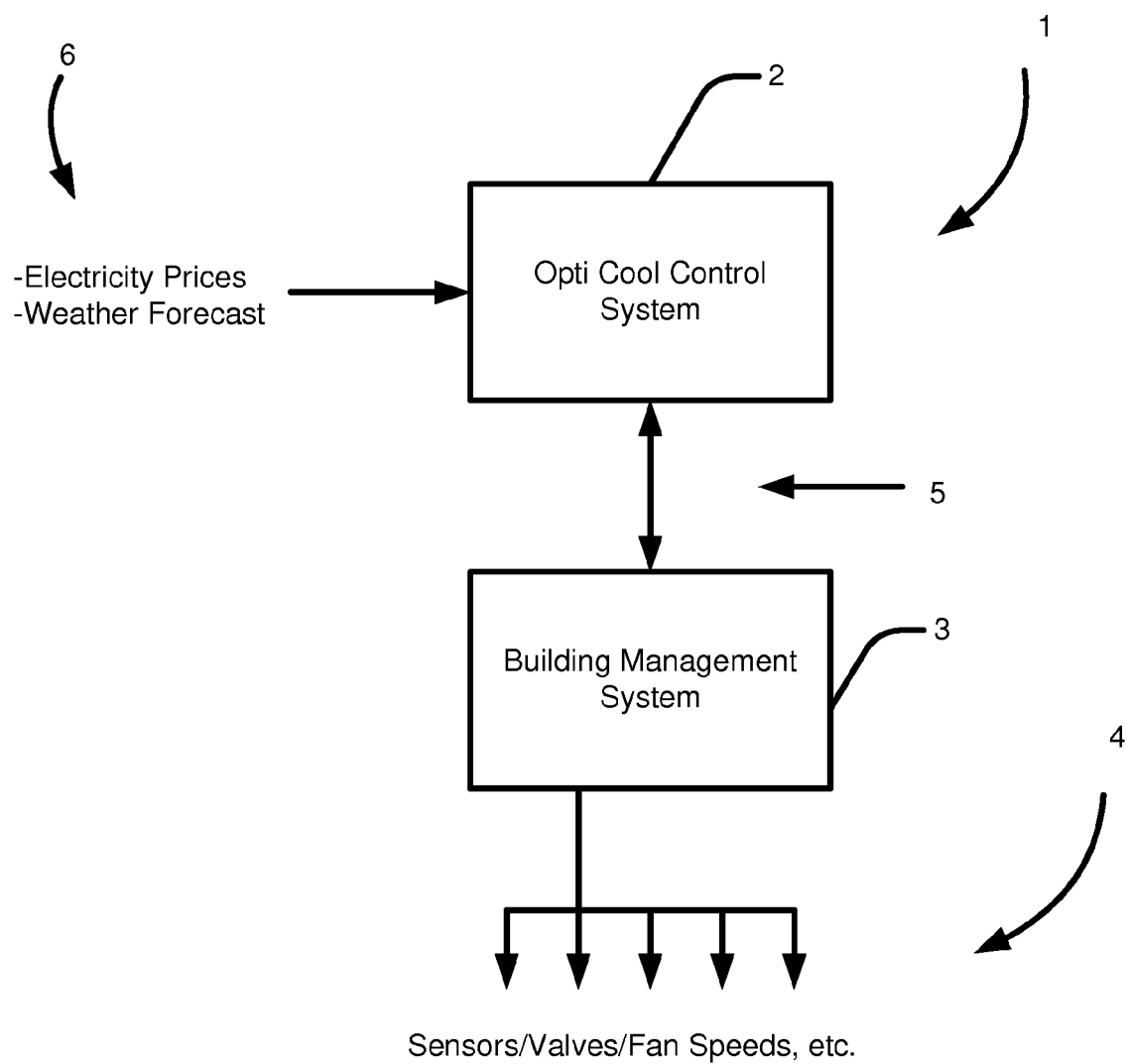
FIG. 1 is a schematic illustration of the operational environment of a HVAC system.

Preferred embodiments of the invention will now be described, by way of example only, with reference to the accompanying drawings.

In the preferred embodiment there is provided a control system wherein the fundamental setpoint for the system is not temperature but human comfort (a "predicted mean vote" measure). In the preferred embodiments, a human comfort goal is first established, and from this goal zone temperatures, and then plant parameters such as valve and damper positions, fan speeds and so on are controlled in order to achieve this comfort setpoint. This is to be contrasted with the prior art which normally rely on temperature based setpoint schemes. For example, there could be a range of different temperatures that all achieve the same comfort setpoint. Performance wise, by using human comfort as the fundamental control parameter, it is possible to realise significant energy and cost savings, whilst maintaining a particular level of human comfort.

The system of the preferred embodiment also provides a system and method that continuously updates the thermal model of the commercial building. The preferred embodiment relies upon a continuously adjustable thermal model of the commercial building. In the preferred embodiment, the control system continuously re-learns thermal and comfort models, and subsequently re-plans the behaviour of the commercial building at very regular intervals. In one example embodiment, the following planned steps are taken:

Once a day, the system uses historical performance data to learn a thermal model of the commercial building. This model includes specific consideration of the time of day and day of the week, so the generated thermal model is cognisant of time of day and day of the week.

Every 5 minutes the system creates a new plan for the day ahead's HVAC operation. By regularly updating the day-ahead operating plan, the system is able to adapt to changing weather and commercial building usage patterns throughout the day.

Every 10 seconds the system examines the day-ahead operating plan, compares its current state to the planned state, and controls the HVAC plant to strive towards adhering to the day-ahead operating plan.

The continuous learning and re-planning behaviour provides a performance advantage in that the system is able to cope with dynamic changes to the commercial building—both fast (for example, a sudden influx of occupants changing the thermal response of a section of the commercial building) or slow (for example, trees growing up alongside the western wall of a building, changing its thermal response late in the afternoon). Further, in practice, Commercial Buildings and HVAC systems often move away from the state they were in at initial commissioning, and without continuous learning and adaptation, the subsequent poor performance of the HVAC system can result in poor human comfort and low energy efficiency.

HVAC control in a typical commercial building is carried out by a building management system—a computer program and related hardware, actuators, sensors and controllers that measures and adjusts chiller, heater and air handling unit operation to regulate temperature for the commercial building occupants.

To improve commercial building energy performance, a more advanced approach is required, that manages resources such as energy consumption and financial expenditure, whilst providing appropriate environmental conditions. Having considered the various types of resources and desired environmental conditions, the role of an advanced commercial building control system is to allow a balance to be found between what are inevitably competing goals. Finding a suitable balance is one of the key functions of the preferred embodiment.

Features of the HVAC control system of the preferred embodiment that are not included in common HVAC controllers include:

An awareness of different energy sources and the implications of their usage—for example a commercial building may use natural gas based heating, and electricity based cooling. Different fuel types have different cost and greenhouse gas implications, while the particular plant items which are utilised at different load levels operate with different efficiencies.

Use of forecasting to move away from a reactionary control philosophy. As an example, many commercial buildings in temperate climates will operate in heating mode in the morning, followed by cooling mode later in the day. By taking into account anticipated weather and thermal loads later in the day, heating can be appropriately limited, thereby reducing both heating load and the subsequent cooling load.

Explicit consideration of human comfort via thermal comfort models and using measured temperatures and humidity and nominal values of other factors (airspeed, clothing and activity levels).

Further consideration of individual buildings and occupants. Despite advances in thermal comfort research, the best measure of comfort and satisfaction will always be feedback from the building occupants themselves. The preferred embodiment includes a mechanism for obtaining occupant feedback regarding thermal comfort and satisfaction. This user feedback is used to calculate a comfort offset map for each HVAC zone, which is added to the computational thermal comfort model to reflect local user preferences. Responding to actual user comfort information at zone level provides the opportunity to drop below the theoretical 5% lower bound on the percentage of people dissatisfied in a building.

A mechanism for balancing (i) running costs, (ii) greenhouse gas emissions and (iii) occupant thermal comfort when controlling the HVAC system.

Implementation Details

Turning initially to FIG. 1, there is illustrated schematically, the operational environment 1 of the preferred embodiment. The preferred embodiment, hereinafter referred to as the OptiCOOL control system 2, is a supervisory control system. That is, OptiCOOL interfaces, or is a component of, an existing building management system (BMS) 3, and provides high-level commands to the BMS. The OptiCOOL control system does not consider control of individual valves, fan speeds, interface to sensing or control equipment 4—these low level functions are left for the BMS system 3. OptiCOOL interfaces 5 to the BMS through an HVAC industry standard communications interface (a number of these are available), and takes basic data from the BMS such as zone temperatures, chiller and fan set points. OptiCOOL 3 combines this HVAC plant data with outside data 6 including electricity price, weather forecasts, user comfort data and the thermal model for the building to make a control decision that provides a basic zone setpoint temperature back to the BMS 3. The BMS then manages the HVAC plant to achieve this setpoint temperature.

Figure 2:
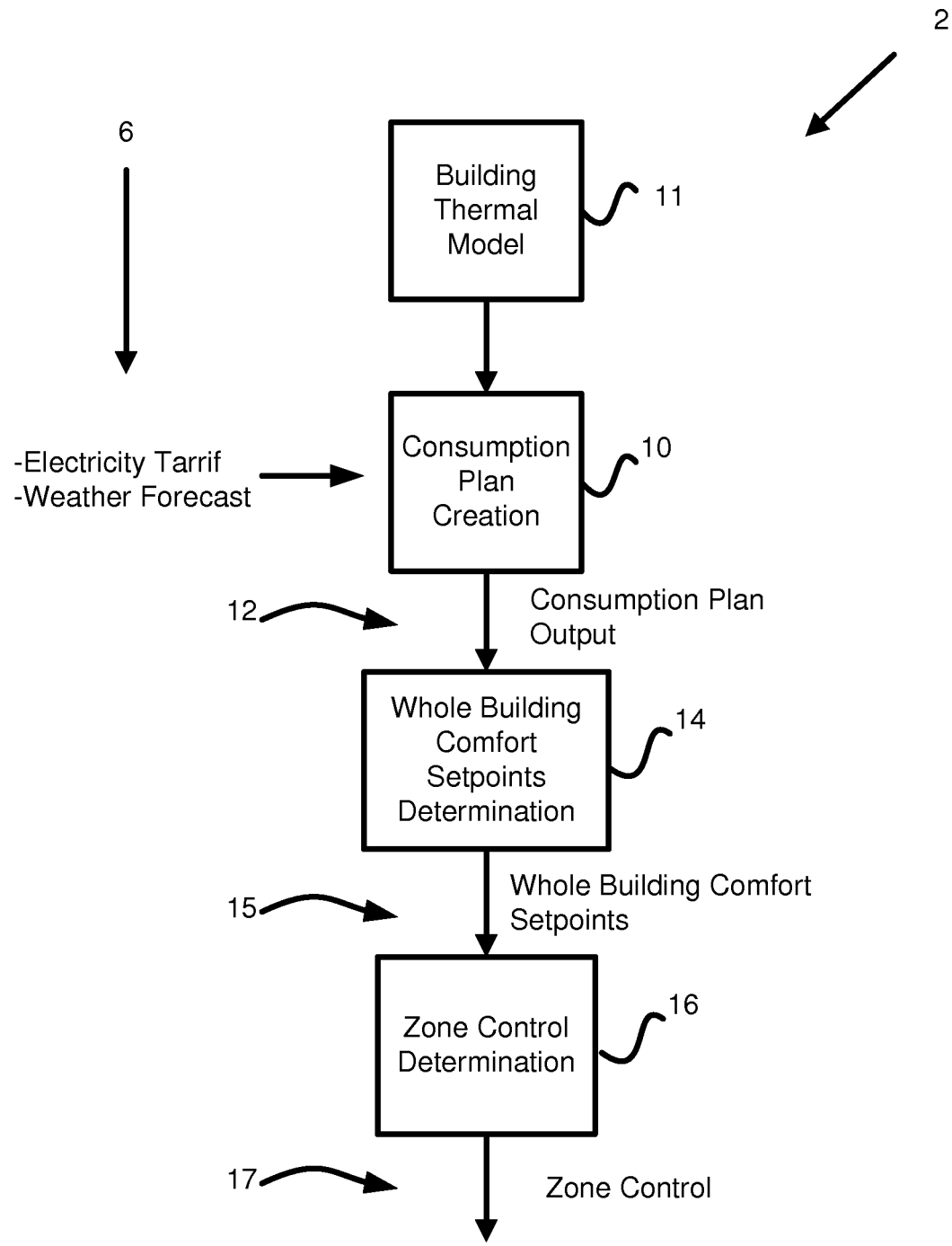
FIG. 2 illustrates a schematic block diagram of the Opticool System of the preferred embodiment.

As noted previously, the OptiCOOL control system 3 is based around establishing a day-ahead, or similar time period, operating plan for the whole-building HVAC plant. The OptiCOOL control system is illustrated in more detail in FIG. 2. To achieve such a plan 10, a thermal model of how the building responds to weather and HVAC plant actions is needed. The model 11 is "learnt" from historical building data.

Figure 3:
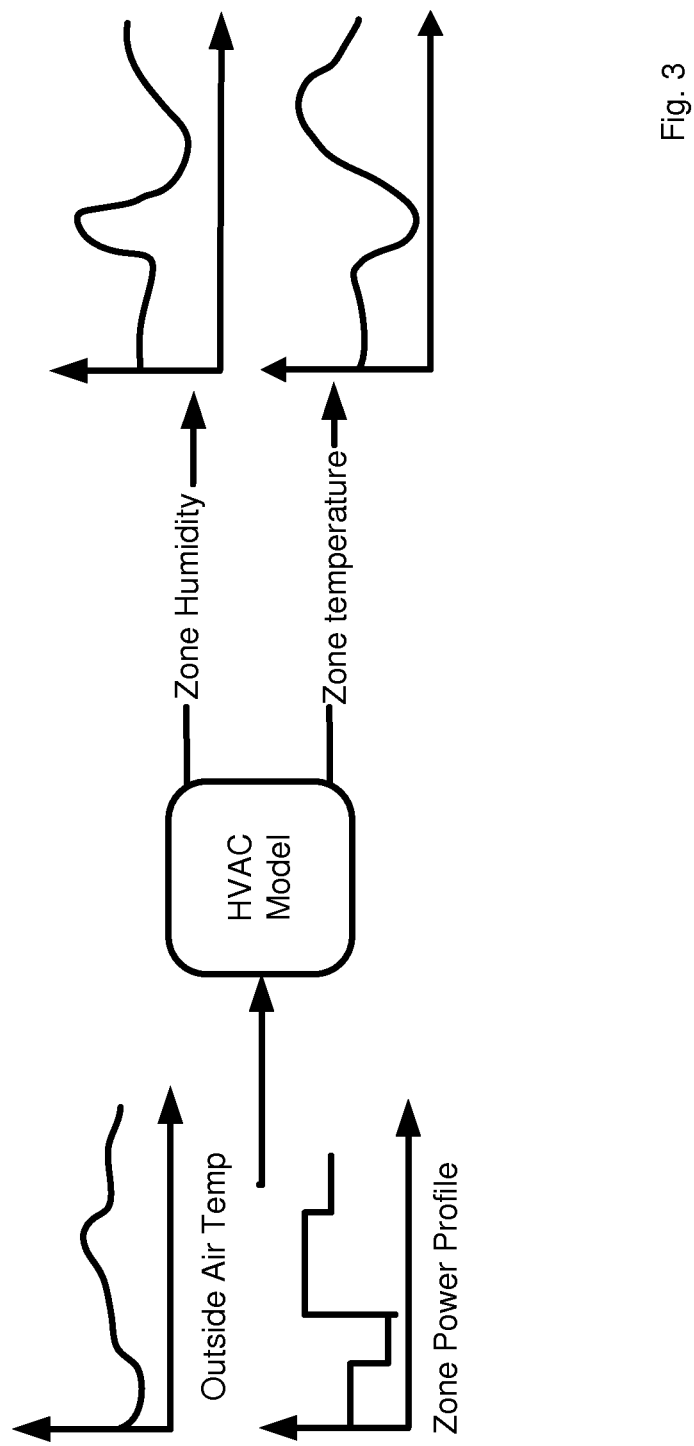
FIG. 3 illustrates schematically the functionality of the commercial building model development.

To enable intelligent scheduling of HVAC systems, a model is required that can evaluate the system response to the range of possible control actions. Once a model has been fitted to the system under control, it is able to be used as part of an optimisation loop which evaluates a range of possible control actions to identify an appropriate control strategy. FIG. 3 illustrates the basic HVAC model implicitly encapsulating building thermal performance, HVAC system behaviour and building thermal loads. Using external thermal conditions and zone power consumption as inputs, the model is able to learn their relationship to zone conditions.

To identify a zone's response to setpoint changes and external conditions, several modelling approaches could be utilised. In some embodiments, sophisticated learning techniques are employed. In other embodiments a simple "black box" model is derived solely from observation of input/output characteristics, without explicit knowledge of the underlying physical process being modelled. These latter models are particularly useful for complex and nonlinear multi-variable systems, and the approach avoids the need for any manual configuration of system parameters. It was found that a simple polynomial approach was suitable. The benefit of this model is that it is linear in the fitted parameters, substantially simplifying the model fitting process.

In one embodiment, a sophisticated learning process is implemented into the HVAC model. This process involves the estimation of parameters of the model that aims to capture how the building responds to ambient temperature, as well as HVAC cooling and heating power. An example of such a model is described below under the section "Example of a Building Model".

Input data can be manually entered, or appropriate interfaces to each information source undertaken. For example, in one embodiment, Java interfaces have been developed to obtain weather prediction data from the Australian Bureau of Meteorology, real time electricity pricing information from the Australian Electricity Market Operator, and building occupant comfort survey results.

The polynomial model utilises HVAC power, ambient temperature and an identified thermal baseload profile for the building to estimate the average zone temperature for the building. This model is based on the form:

$$T_{Av} = \frac{k_1 s^2 + k_2 s + k_3}{(\tau_1 s + 1)(\tau_2 s + 1)} T_{ambient} + \frac{k_4 s + k_5}{(\tau_1 s + 1)(\tau_2 s + 1)} P_{HVAC} + \left\{ \begin{array}{c} \text{Initial} \\ \text{Conditions} \end{array} \right\} + \left\{ \begin{array}{c} \text{Thermal} \\ \text{Baseload} \end{array} \right\}$$

Where $T_{AV}$ is the is the average zone temperature throughout the building, $T_{ambient}$ is the ambient outside temperature, $P_{HVAC}$ is the total power consumed by the HVAC system, k1, k2, k3, k4, k5 are adjustable parameters obtained by best fit to measured data, $\tau_1$, $\tau_1$ are the dominant thermal time constants of the building HVAC system, s is the complex Laplace variable, 'Initial Conditions' accounts for uncertainty in the internal thermal states of the building fabric and HVAC system at the start of the measurement period. These initial conditions result in a transient that is a combination of the natural modes of the system and hence is of the form: $k_6 e^{-t/\tau_1} + k_7 e^{-t/\tau_2}$. These modes are explicitly identified so as to not bias the system identification. Thermal Baseload is an identified baseload profile that accounts for different thermal loads throughout the day. This is dependant on factors such as solar gain and the activities of the building occupants. The thermal baseload can be parameterised as a piecewise linear function. This baseload function is defined to be identical for each day in the data set and is determined to be independent of ambient temperature and HVAC power.

Figure 9:
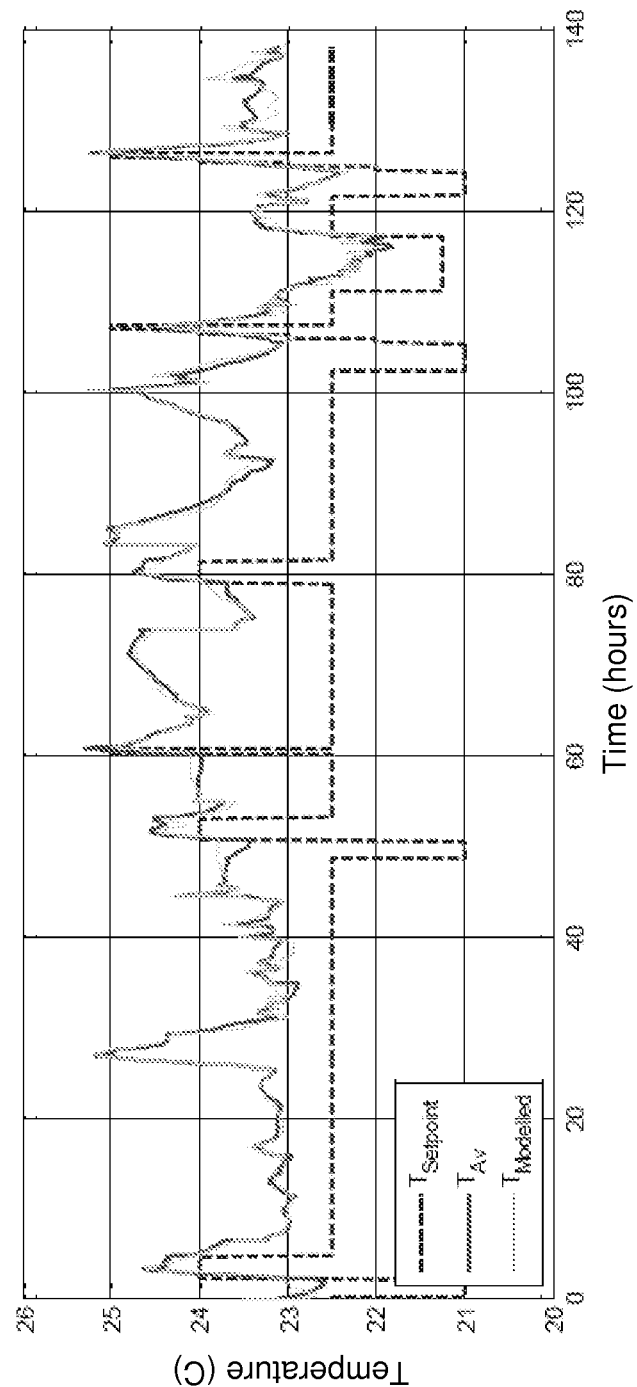
FIG. 9 illustrates the results of modelling commercial building zone temperatures.

Utilising data from a trial building with a conventional VAV system, five minute interval data for 16 days was fitted to the polynomial model using regression analysis to determine the various parameters. The coefficient of determination of the fit over this data set is $r_2 = 0.956$, suggesting that the model provides a good fit. Additional second order terms were evaluated (i.e. power squared) but they did not significantly increase the explained variance and so this was not included in the model. An example of the resultant fit is shown in FIG. 9.

Once a building thermal model 11 has been established, this model is used together with a weather forecast and electricity tariff information 6 to put together a consumption plan output 12 for the HVAC plant. This plan is a time series power profile for the building, based on accumulating the power consumption of individual HVAC plant needed to achieve a predicted mean vote (PMV) comfort setpoint for the whole building. To find and output this plan 12, an optimisation routine considers a large variety of possible power profiles for the building, and decides which profile to use based on a cost function that considers the priority of occupant comfort, running expenditure and $CO_2$ emissions. Once the optimal (cost minimal in terms of the cost function) power profile 12 has been determined, this profile is then translated to a whole-building comfort profile, where a whole-building comfort setpoint is determined for regular intervals throughout the day.

Once a whole-building comfort setpoint 15 is determined, actual HVAC control is based on separately controlling individual zones of the building via zone control determination 16.

Figure 4:
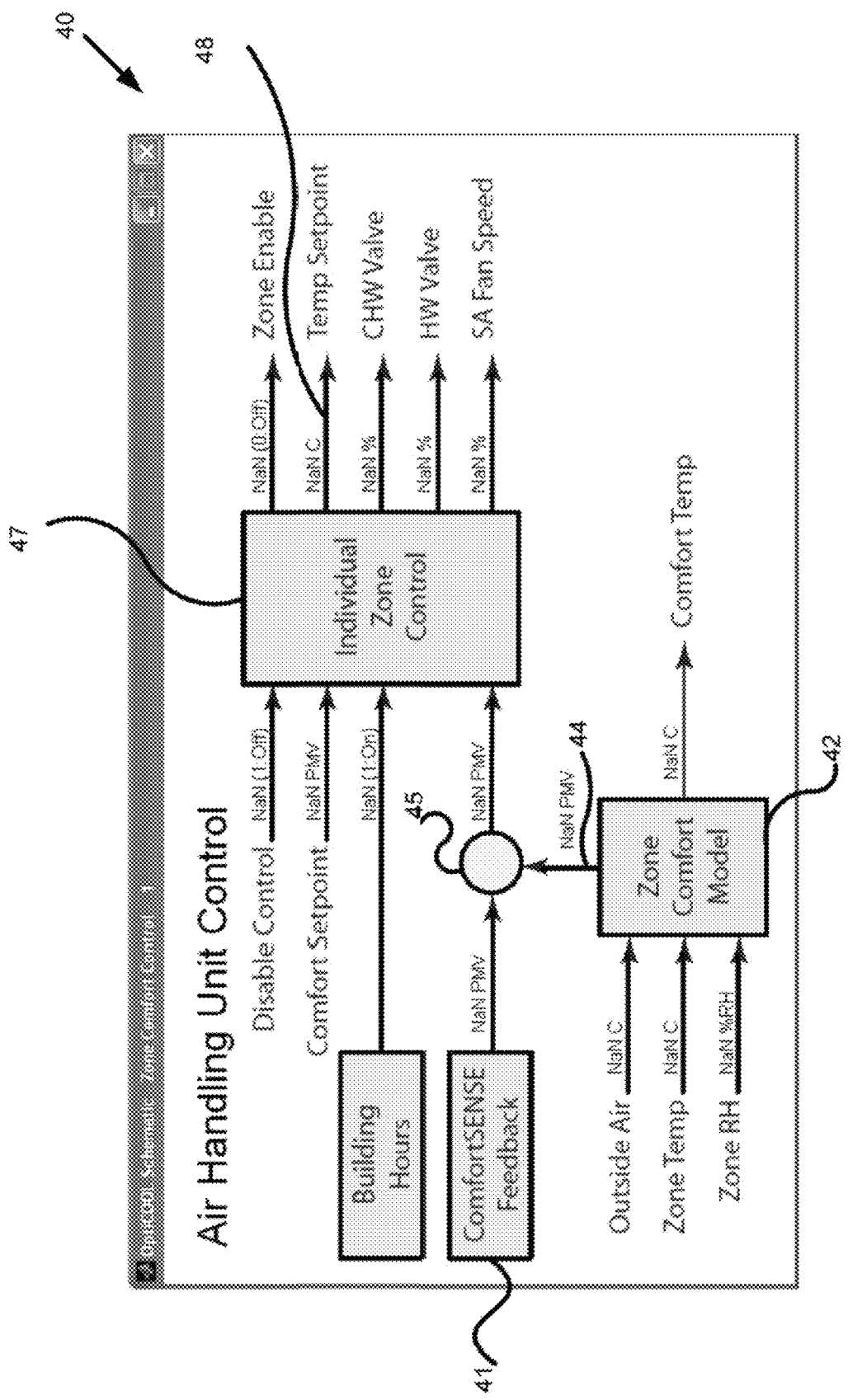
FIG. 4 illustrates schematically the comfort based zone control.
Figure 5:
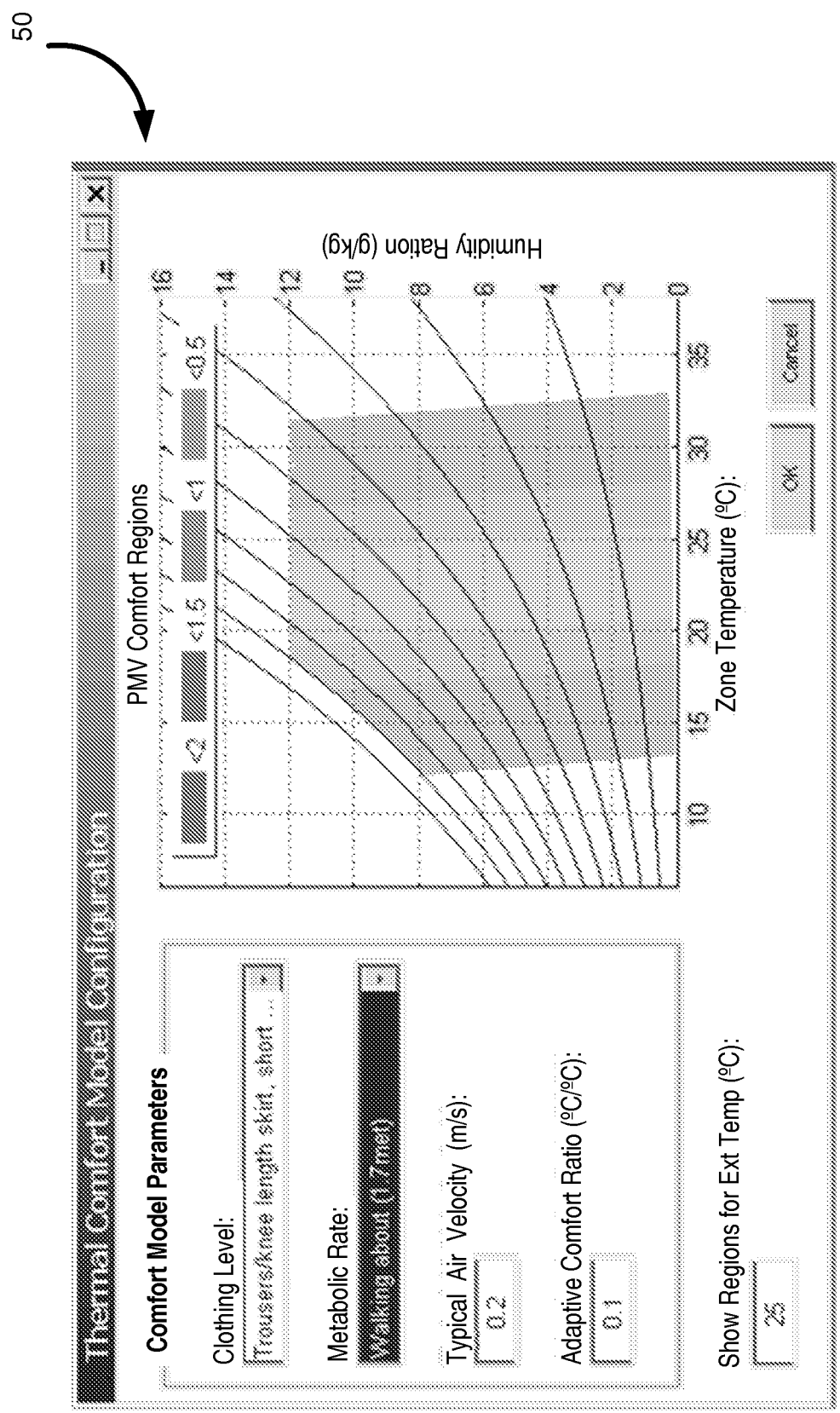
FIG. 5 illustrates an example interface for thermal comfort modelling of a zone.

As shown in FIG. 4, (a screenshot 40 from the control system), zone control 17 is based on three main function blocks: A comfort feedback block 41 that takes user feedback based on a ComfortSENSE client application, and converts this to a "percentage of people dissatisfied" figure. A zone comfort model block 42, that takes zone temperature (provided by the BMS via the OptiCOOL-BMS data link), and uses the ASHRAE-55 standard "Thermal Environmental Conditions for Human Occupancy" to calculate predicted mean vote (PMV) 44 and predicted percentage of people dissatisfied (PPD) figures for the zone. The functionality of this block is shown in FIG. 5. The theoretical PMV and PPD figures are then offset 45 by a measured PPD figure obtained from the comfort feedback block. If no data is available from the comfort feedback block (its usage is optional), then the system will base its PMV/PPD figures entirely on the theoretical ones calculated from the ASHRAE standard.

The zone control block 47 takes a predetermined comfort setpoint (PMV) for the zone from the whole-building control loop, zone and external temperature (from the BMS), and the actual PMV/PPD value from the comfort model, and determines a zone setpoint temperature 48 to achieve the desired zone PMV setpoint.

Figure 6:
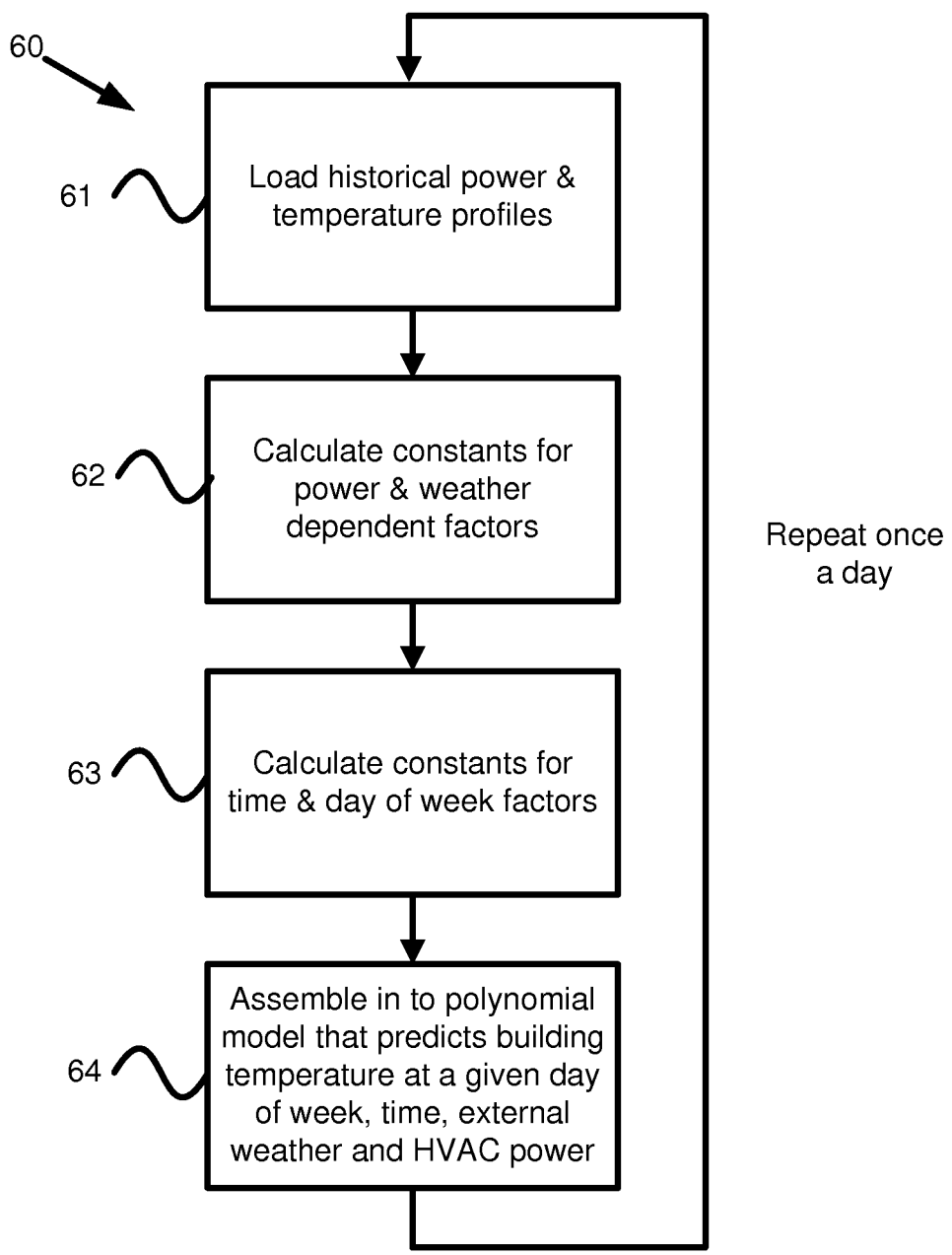
FIG. 6 illustrates the thermal modelling loop for modelling the thermal behaviour of a commercial building.

Returning to FIG. 2, there are three core control loops in the OptiCOOL software system 2: These include: A thermal modeling loop for determining the building thermal model 11, a power planning loop for determining a power consumption plan 10, and the building setpoint determination loop for setting building zone setpoints. The three forward-looking plans that the OptiCOOL software system creates are continuously optimised and updated. That is, building thermal models, feedback-adjusted human comfort models, and subsequently the whole building power profile are updated at regular (predefined) control intervals. This behaviour is significant, as it allows the system to respond to changing external factors such as sudden shifts in predicted electricity price or weather forecast, building usage or human comfort. This behaviour results in an always-updating look-ahead profile of HVAC power consumption, human comfort and time. The three main loops can operate as follows:

The Modeling Loop (FIG. 6)

A modelling loop 60, which executes once a day and forms the thermal model 11 of the building that predicts internal temperature based on the day of the week, time of day, HVAC power consumption and external weather. The steps in the loop include: loading historical power and corresponding temperature profiles 61, calculating expected resultant power and weather dependant factors 62, calculating constants for time and day of the week factors 63 and assembling a polynomial model that predicts building temperature at a given day of the week, time, expected external weather and HVAC power 64.

Figure 7:
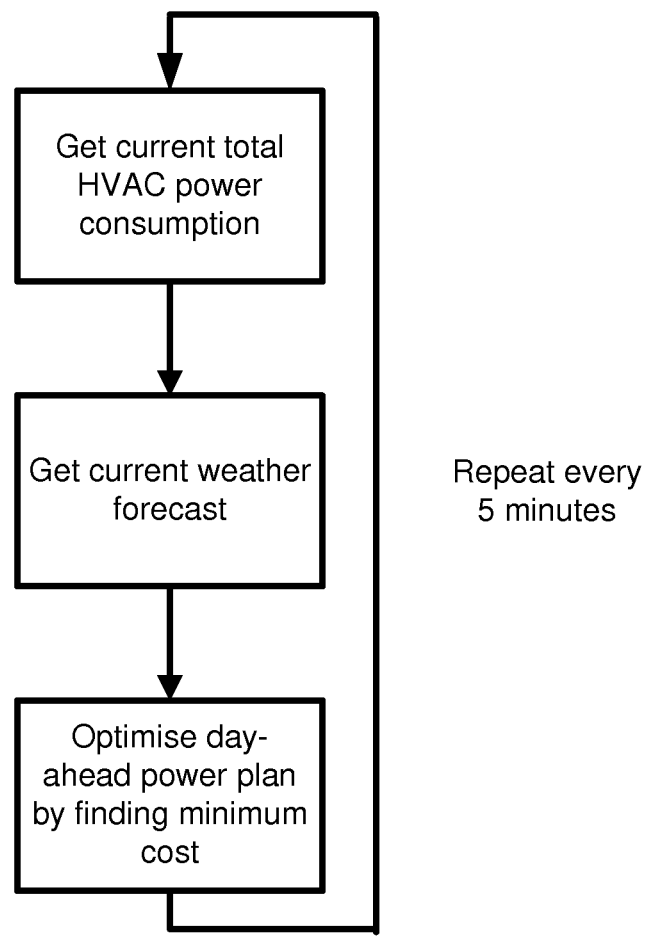
FIG. 7 illustrates a commercial building power planning loop.

Power Planning Loop (FIG. 7)

The power planning loop, executes every 5 minutes, and creates a 24-hour ahead planned HVAC power consumption profile 12 for the building. This loop first determines the current total HVAC power consumption, determines a future weather forecast and produces a minimal cost power plan through optimization.

Figure 8:
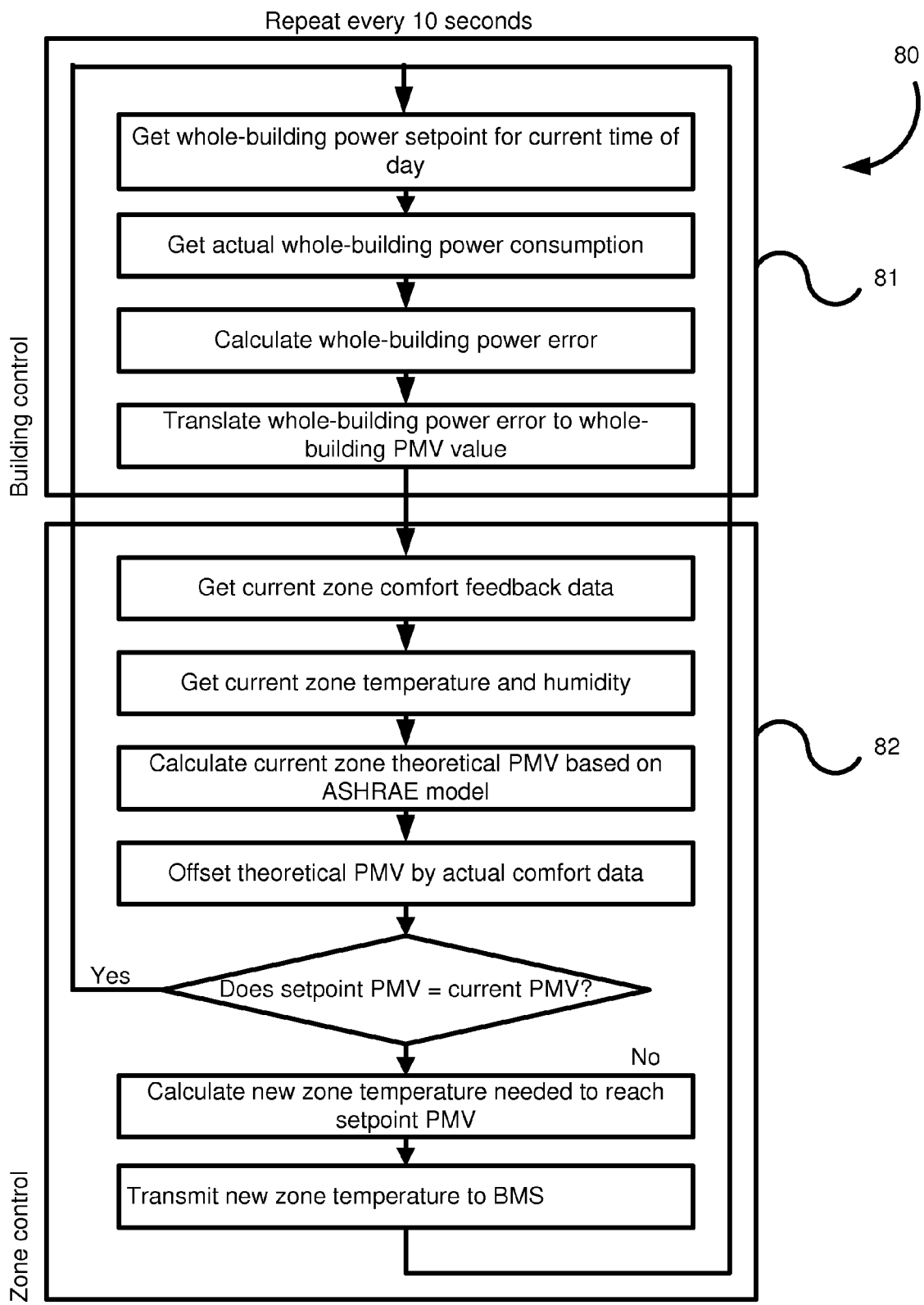
FIG. 8 illustrates the temperature control loop.

Setpoint Determination Control Loop (FIG. 8)

A whole building setpoint determination control loop 14, 80, executes every 10 seconds, taking the building power plan 81, and providing the BMS with a zone setpoint temperature 82 targeted at achieving this power plan. The control system uses human comfort as the planned parameter for every HVAC zone of the building. Human comfort is translated in to physical parameters such as indoor temperature and humidity by applying the ASHRAE comfort models, including any shift based on local user feedback. Building parameters such as fan speed or valve set-points are not specified as these are left to implementation by the incumbent BMS to ascertain based on the zone temperature data provided.

The implemented system uses one modelling technique—the linear time invariant technique. This technique is based on using a constrained least squares fit algorithm to parameterise a third-order linear time invariant model of the building's thermal response.

Initial conditions for the system are established by operating the algorithm on historical building performance data.

The intelligent HVAC supervisory control system can be readily retrofitted to existing building management systems (BMS) through industry standard process control interfaces such as OPC. The intelligent HVAC controller utilises machine learning techniques to automatically form models of the surrounding built environment, using these models to evaluate different control strategies for determining optimal HVAC operating plans. As this technology is targeted towards both new and existing building stock and requires minimal capital expenditure, significant inroads can be made towards reducing operating costs with relatively short payback periods. Further, improvements in building energy efficiency and performance ratings can be facilitated through reduced energy consumption and associated $CO_2$ emission reductions.

Assessing Thermal Comfort and Productivity

Although temperature most readily comes to mind when considering thermal comfort, there are many other contributing factors. These include air velocity, radiant temperature, humidity, metabolic rate and clothing level. The ASHRAE-55 (ASHRAE, 2004) standard for "Thermal Environmental Conditions for Human Occupancy", details methods for theoretically determining Predicted Mean Vote (PMV) and Predicted Percentage of Dissatisfied (PPD) occupants for a given set of conditions.

In assessing and predicting thermal comfort, the PPD metrics (implemented via the user interface 50 of FIG. 5) are integrating with an occupant comfort feedback application. In the case of the ASHRAE adaptive comfort standard, a wider range of conditions have been found to be acceptable where a building is naturally ventilated and users have direct control over their environmental conditions—such as by opening/closing windows. Similarly providing a mechanism for individual occupant comfort feedback improves thermal satisfaction—not only from the direct physical effect of user adjustments on indoor climate, but also from empowerment of the occupants [Brager et al. 2004].

The occupant application can reside on an occupant's personal computer, informing them of a change in HVAC mode of operation (e.g. Air Conditioning, Natural Ventilation, Peak Demand) via a small colour coded icon and informative "pop-up" message alerts. The above discussion deals with assessing thermal comfort, however in the context of a workplace there is the additional complicating question of what effect thermal comfort has on productivity. Despite many studies attempting to quantify this, results are far from clear and on assessing results from multiple studies, Seppänen et al. (2003, 2006) found no statistically significant difference in productivity for temperatures between 21 to 25° C. With temperatures above 25° C., Seppänen found a drop in productivity of approximately 2% per degree centigrade.

It was found that, while maintaining identical thermal comfort to the existing BMS, substantial savings on both energy costs & $CO_2$ emissions are feasible.

By allowing the building manager or user to determine the relative weightings given to the competing performance objectives, they are empowered with explicit knowledge of tradeoffs being made when selecting a particular control strategy.

Example of a Building Model

This learning process model involves estimation of parameters of a model that aims to capture how the building responds to ambient temperature, as well as HVAC cooling and heating power. The parameter estimation is a least-squared-error fit to a set of learning data. The learning data is collected from a BMS either in real-time or off-line, from a BMS history of set point values. The learning process is not affected by how the data is collected (real-time or off-line), but it does require a sufficient amount of data to be collected to ensure a "good enough" fit.

One embodiment of the model has the following form:

$$T_{int}(z) = F_{amb}(z)T_{amb}(z) - \frac{10}{P_{coolTyp}}F_{Pcool}(z)P_{cool}(z) + \frac{1}{P_{heatTyp}}F_{Pheat}(z)P_{heat}(z) + B(z) \quad (1)$$

where: $T_{int}(z)$ is the average internal building temperature; $T_{amb}(z)$ is the ambient temperature; $P_{cool}(z)$ is the HVAC cooling power consumption; $P_{coolTyp}$ is the typical HVAC cooling power consumption; it is used in Equation (1) as a scaling factor to get the magnitude of the parameters of $F_{Pcool}(z)$ in a similar numerical range as other parameters; also it provides a normalization mechanism that allows for operation on different BMS systems—this is particularly important with respect to optimization constraints; $P_{heat}(z)$ is the HVAC heating power consumption; $P_{heatTyp}$ is the typical HVAC heating power consumption; it is used in Equation (1) as a scaling factor to get the magnitude of the parameters of $F_{Pheat}(z)$ in a similar numerical range as other parameters; also it provides a normalization mechanism that allows for operation on different BMS systems—this is particularly important with respect to optimization constraints; $F_{amb}(z)$ represents the internal building temperature response to ambient temperature; $F_{Pcool}(z)$ represents the internal building temperature response to HVAC cooling power; $F_{Pheat}(z)$ represents the internal building temperature response to HVAC heating power; B(z), "baseline", represents factors other than those represented by $F_{amb}(z)$, $F_{Pcool}(z)$ and $F_{Pheat}(z)$; 10 is an arbitrary scaling factor used to obtain the magnitude of the parameters of $F_{Pcool}(z)$ in a similar numerical range as other parameters; in other embodiments different scaling factors are used.

In the above described model, the items of particular interest are the transfer functions that express the dynamic response to ambient temperature and heating/cooling power and the baseline. These transfer functions are, in one embodiment, collections of $1^{st}$ order low-pass filters with different time constants, with each filter having the form:

$$F(z) = \frac{a}{z - (1-a)} \quad (2)$$

where $z^{-1}$ is the difference operator and a is given by:

$$a = \frac{h}{\tau - h} \quad (3)$$

where $\tau$ is the system time constant and h is the sampling interval. In other embodiments the transfer functions are indicative of other types of functions such as higher order filter functions. As a rule of thumb it is necessary to ensure that the sampling is sufficiently fast compared to the time constant, typically:

$$h \leq \tau/5 \quad (4)$$

This is an important consideration when retrieving historical data from a BMS. In the discrete time domain, the first order filter of Equation (2) takes the form:

$$y(t_k) = (1-a)y(t_{k-1}) + ax(t_k) \quad (5)$$

where $x(t_k)$ is the input and is represented as per Equation (3) above and $t_k$ is the sampling time of sample k. It should be noted that the presently described embodiment uses $x(t_{k-1})$ instead of $x(t_k)$—this is a minimal difference and there should ideally be little if any effect in practice. In other embodiments, different representations of $x(t_{k-1})$ are implemented. However, for the presently described embodiment the following form will be used:

$$y(t_k) = (1-a)y(t_{k-1}) + ax(t_{k-1}) \quad (6)$$

The notation can be simplified by using sample numbers only:

$$y(k) = (1-a)y(k-1) + ax(k-1) \quad (7)$$

Response to Ambient Temperature and HVAC Power

In the present embodiment, the building response to ambient temperature as well as cooling/heating HVAC power is modeled as a set of three $1^{st}$ order systems, each of the form of Equation (5), with different time constants. Specifically, $$a_{1h} = 5/60,\; a_{2h} = 5/120,\; a_{5h} = 5/300 \quad (8)$$

are the parameters of Equation (3) corresponding to time constants of 1 h, 2 h and 5 h time constants of three $1^{st}$ order responses (noting that they are not quite in line with Equation (3) but close enough for present purposes. Given this, and with $F_{1h}$, $F_{2h}$, $F_{5h}$ being the $1^{st}$ order filters of the form of Equation (2) corresponding to these time constants, the dynamic responses to ambient temperature, HVAC cooling power and HVAC heating power are modeled as:

$$F_{amb}(z) = p_{11} + p_{12}F_{1h}(z) + p_{13}F_{2h}(z) + p_{14}F_{5h}(z) \quad (9)$$

$$F_{Pheat}(z) = p_{21} + p_{22}F_{1h}(z) + p_{23}F_{2h}(z) + p_{24}F_{5h}(z) \quad (10)$$

$$F_{Pcool}(z) = p_{31} + p_{32}F_{1h}(z) + p_{33}F_{2h}(z) + p_{34}F_{5h}(z) \quad (11)$$

In the time domain, the dynamic response (or filtered response—hence the superscript F) to the above becomes:

$$T_{amb}^F(k) = p_{11} + p_{12}T_{amb\text{-}1h}(k) + p_{13}T_{amb\text{-}2h}(k) + p_{14}T_{amb\text{-}5h}(k) \quad (12)$$

$$P_{heat}^F(k) = p_{21} + p_{22}P_{heat\text{-}1h}(k) + p_{23}P_{heat\text{-}2h}(k) + p_{24}P_{heat\text{-}5h}(k) \quad (13)$$

$$P_{Cool}^F(k) = p_{31} + p_{32}P_{cool\text{-}1h}(k) + p_{33}P_{cool\text{-}2h}(k) + p_{34}P_{cool\text{-}5h}(k) \quad (14)$$

where:

$$T_{amb\text{-}Nh}(k) = (1-a_{Nh})T_{amb\text{-}Nh}(k-1) + a_{Nh}T_{amb}(k-1) \quad (15)$$

$$P_{cool\text{-}Nh\_}(k) = (1-a_{Nh})P_{cool\text{-}Nh}(k-1) + a_{Nh}P_{cool}(k-1) \quad (16)$$

$$P_{heat\text{-}Nh\_}(k) = (1-a_{Nh})P_{heat\text{-}Nh}(k-1) + a_{Nh}P_{heat}(k-1) \quad (17)$$

with N being 1, 2 and 5 for the 1 h, 2 h and 5 h time constants respectively. The parameters $p_{ij}$ express the relative contributions of the dynamic responses corresponding to the various time constants. These parameters are estimated ("learned") as described below in "Learning: Model Parameter Estimation".

Applying the above equations to the overall building model of Equation (1) gives the following time domain version:

$$T_{int}(k) = T_{amb}^F(k) - \frac{10}{P_{coolTyp}} P_{cool}^F(k) + \frac{1}{P_{heatTyp}} P_{heat}^F(k) + B_{state}(k) \quad (18)$$

Here the baseline $B_{state}(k)$ is a catch-all function that captures changes to the average internal temperature response outside what is modeled by the ambient temperature and cooling/heating power response. The subscript "state" is either "week day" or "weekend", with the former signifying active building operation during typical working hours and the latter signifying weekend operation. Thus, in effect there are two different models depending on the day of the week.

In one embodiment the specific form of the baseline function is as follows:

$$B_{state}(k) = \sum_{i=1}^{11} B_{h_i}(t_k) \quad (19)$$

where $B_{h_i}(t_k)$ represents a basis function and is given by:

$$B_{h_i}(t_k) = \begin{cases} \dfrac{B_{h_{i+1}}}{h_{i+1} - h_i}(t_k - h_i) + \\ \dfrac{B_{h_i}}{h_{i+1} - h_i}(h_{i+1} - t_k) & \text{if } h_i \le t_k < h_i \\ 0 & \text{otherwise} \end{cases} \quad (20)$$

Figure 10:
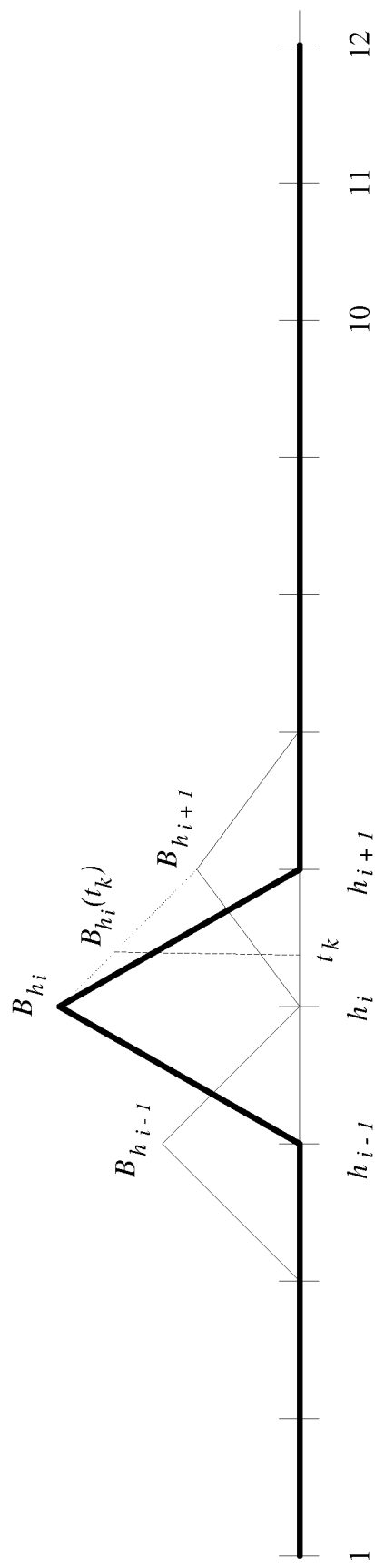
FIG. 10 illustrates a set of triangular basis functions used to create a baseline function for a building model of one embodiment of the invention.

In Equation (20) the values $B_{h_i}$ are estimated at specific, a-priori fixed points throughout the day $h_i$. One form of the estimation process is described below. Equation (19) in practice equates to sampling of a set of linear combinations of triangular shaped functions, as shown in FIG. 10. This figure illustrates establishing the value of $B_{h_i}(t_k)$ at time $t_k$, which falls between $h_i \le t_k < h_{i+1}$. In line with Equation (19), the value of $B_{h_i}(t_k)$ is a combination of the triangular function with the peak at $B_{h_i}$, and the triangular function with the peak at $B_{h_{i+1}}$. Based on this, the $B_{state}(k)$ of Equation (19) is given by $B_{h_i}(t_k)$ as all other triangular functions (a total of 12 inclusive of $B_{h_i}$, $B_{h_{i-1}}$ and $B_{h_{i+1}}$) contribute 0.

The number 12 reflects the fact that there is expected to be a significant difference in the baseline behaviour on a bi-hourly basis (captured by a peak of one of the triangular functions), with the in-between times adequately modelled by the linear combination of the triangular functions, equivalent to linear interpolation between the peaks of the contributing triangular functions.

Figure 11:
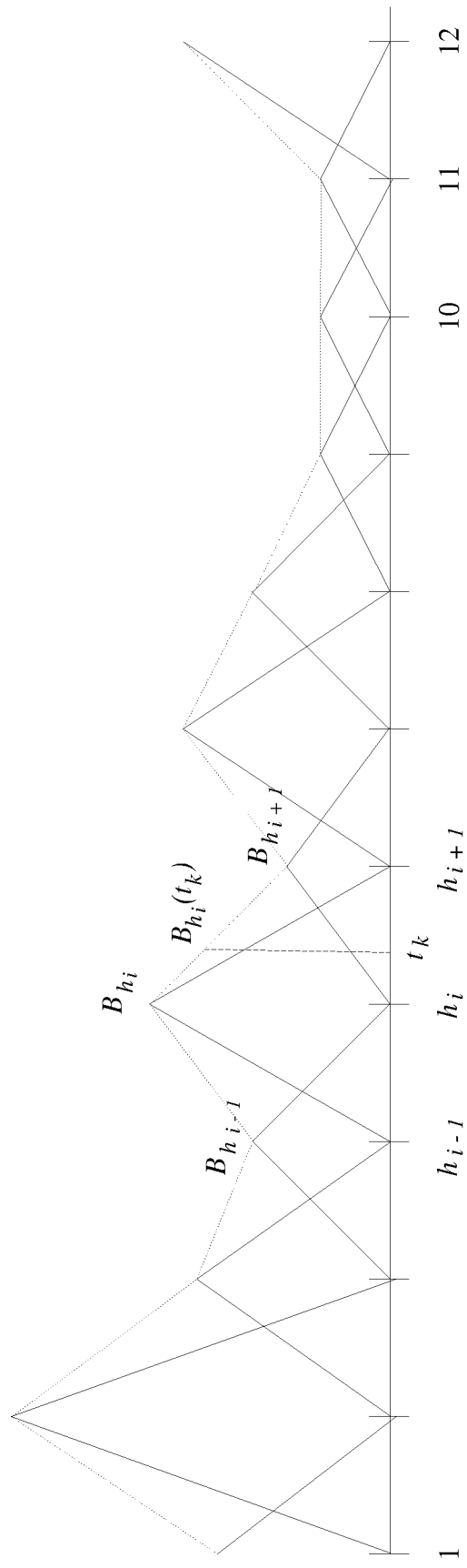
FIG. 11 illustrates a full set of 12 triangular basis functions used to create a baseline function for a full day of a building model.

FIG. 11 illustrates a full set of 12 hypothetical triangular functions, and the resulting $B_{state}(k)$ (shown as the dotted envelope) for all $t_k$. The peak values $B_{h_i}$ are determined as part of the learning process discussed later.

The intent of the baseline function is to capture how the building load (outside what is captured by Equations (9) to (17)) varies throughout the day. For example, it is natural to expect that the influx of people in the early morning hours will have an effect on the building's thermal dynamics, as will the exodus of people during lunch hours, as well as late during the day. There is a set of 12 triangular functions for the week day baseline, and a separate 12 for the weekend baseline.

It will be appreciated that in other embodiments different forms of baseline functions can be implemented using different combinations of basis functions.

Learning: Model Parameter Estimation

The "learning" process of one embodiment consists of estimating the parameters $p_{jj}$ in Equations (9) to (11), as well as $B_{h_i}$ in Equation (20). In one embodiment the estimation process is a constrained linear least squares fit:

$$\hat{p} = \min_{p} |Dp - T_{int}^A|^2 \quad \text{subject to} \quad Ap \le b \quad (21)$$

Where $\hat{p}$ is a vector of estimated building parameters; D is a data matrix consisting of the filtered building data as well as baseline function "values" (more below), p ranges over the building parameter space with the constraint $Ap \le b$ (more on the constraint below). In explicit terms, $Dp-T_{int}^A$ has the form:

$$\begin{bmatrix} T_{amb}^{FA}(0) & T_{heat}^{FA}(0) & T_{cool}^{FA}(0) & B(0) \\ \vdots & \vdots & \vdots & \vdots \\ T_{amb}^{FA}(k) & T_{heat}^{FA}(k) & T_{cool}^{FA}(k) & B(k) \\ \vdots & \vdots & \vdots & \vdots \\ T_{amb}^{FA}(K) & T_{heat}^{FA}(K) & T_{cool}^{FA}(K) & B(K) \end{bmatrix} \begin{bmatrix} p_{11} \\ p_{12} \\ \vdots \\ p_{34} \\ B_{h_1} \\ \vdots \\ B_{h_I} \end{bmatrix} - \begin{bmatrix} T_{int}^A(0) \\ \vdots \\ T_{int}^A(k) \\ \vdots \\ T_{int}^A(K) \end{bmatrix} \quad (22)$$

where $$T_{amb}^{FA}(k) = [\,1 \quad T_{amb-1h}(k) \quad T_{amb-2h}(k) \quad T_{amb-5h}(k)\,] \quad (23)$$

$$T_{cool}^{FA}(k) = \frac{-10}{P_{coolTyp}}[\,1 \quad P_{cool-1h}(k) \quad P_{cool-2h}(k) \quad P_{cool-5h}(k)\,] \quad (24)$$

$$T_{heat}^{FA}(k) = \frac{1}{P_{heatTyp}}[\,1 \quad P_{heat-1h}(k) \quad P_{heat-2h}(k) \quad P_{heat-5h}(k)\,] \quad (25)$$

In Equations (23) to (25), the row vector components $T_{amb-Nh}(k)$, $P_{cool-Nh}(k)$ and $P_{heat-Nh}(k)$ are calculated as per Equations (9) to (11), with the $T_{amb\_}(k-1)$, $P_{cool\_}(k-1)$ and $P_{heat\_}(k-1)$ being the actual ambient temperature, cooling power and heating power readings collected from the BMS at time $t_k$; the abbreviation FA in $T_{amb}^{FA}(k)$, $T_{cool}^{FA}(k)$ and $T_{heat}^{FA}(k)$ represents "filtered actual", a reminder of the fact that the row vectors contain filtered versions of actual BMS data. The A in $T_{int}^A(k)$ also signifies actual BMS data—in the presently described embodiment it is the actual average internal building temperature.

The final aspect of Equation (22) that has not been discussed so far is the baseline values B(k). These are samples of the triangular functions centered at $h_i$ (as used in Equation (20)) with peaks at 1:

$$\Delta_{h_i}(k) = \begin{cases} 0 & \text{if } t_k < h_{i-1} \text{ or } t_k \ge h_{i+1} \\ \left(\frac{t_k - h_{i-1}}{h_i - h_{i-1}}\right) & \text{if } h_{i-1} \le t_k < h_i \\ \left(\frac{h_{i+1} - t_k}{h_{i+1} - h_i}\right) & \text{if } h_i \le t_k < h_{i+1} \end{cases} \quad (26)$$

The baseline values B(k) of the presently described embodiment are given by samples of the triangular functions $\Delta_{h_i}(k)$:

$$B(k) = [B_{weekday}(k) \, B_{weekend}(k)] \quad (27)$$

$$B_{weekday}(k) = [\Delta_{h_1}(k) \ldots \Delta_{h_i}(k) \ldots \Delta_{h_{12}}(k)\,0\,0\,0\,0\,0\,0\,0\,0\,0\,0] \quad (28)$$

$$B_{weekend}(k) = [0\,0\,0\,0\,0\,0\,0\,0\,0\,0\,0\,0\,\Delta_{h_1}(k) \ldots \Delta_{h_i}(k) \ldots \Delta_{h_{12}}(k)] \quad (29)$$

The above baseline values are scaled by appropriate choice of parameters $B_{h_i}$ as determined through the constrained linear least squares fit in Equations (21). In other embodiments, other baseline values B(k) and parameters $B_{h_i}$ are implemented.

Returning to the constraints part of Equation (21), the matrix A is designed to achieve a number of constraint relationships:

The parameters $p_{ij}$ and $B_{h_i}$ must be positive.

The sum of the $p_{ij}$'s for ambient temperature filter $T_{amb}^F(k)$ should be close to one; the intuitive meaning of this is that the steady state of the ambient temperature filter should be close to the actual ambient temperature. However, provisions for this do exist within the model of the preferred embodiment, with a constraint range of 2.0 and 4.0. In other embodiments, the heating filter is employed.

The sum of the $p_{ij}$'s for cooling power filter $P_{cool}^F(k)$ should be close to one; the intuitive meaning of this is that the steady state of the cooling power filter should be close to the actual cooling power temperature.

The baseline peaks should typically not exceed 20° C.

The specific form of A that achieves these requirements is:

$$A = \begin{bmatrix} & -I_{36 \times 36} & & \\ I_{4 \times 1} & 0_{4 \times 1} & 0_{4 \times 1} & 0_{24 \times 1} \\ -I_{4 \times 1} & 0_{4 \times 1} & 0_{4 \times 1} & 0_{24 \times 1} \\ 0_{4 \times 1} & I_{4 \times 1} & 0_{4 \times 1} & 0_{24 \times 1} \\ 0_{4 \times 1} & -I_{4 \times 1} & 0_{4 \times 1} & 0_{24 \times 1} \\ 0_{4 \times 1} & 0_{4 \times 1} & I_{4 \times 1} & 0_{24 \times 1} \\ 0_{4 \times 1} & 0_{4 \times 1} & -I_{4 \times 1} & 0_{24 \times 1} \\ & 0_{12 \times 24} & I_{24 \times 24} & \end{bmatrix} \quad (30)$$

where $I_{m \times m}$ is an identity matrix of size m×m and $0_{m \times n}$ is a zero matrix with m columns and n rows. The parameter estimation constraints are contained in the vector b, with a specific example of this vector given by:

$$b = \begin{bmatrix} 0_{1 \times 36} \\ 1.5 \\ -0.2 \\ 2.0 \\ 4.0 \\ -0.2 \\ 2.0 \\ 20_{1 \times 24} \end{bmatrix} \quad (31)$$

where in the above $20_{1 \times 24}$ represents a vector of 24 values of 20.

Optimization

From a model estimated in accordance with the above described parameters it is possible to find optimal power profiles that meet certain 'cost' targets and/or constraints. The discussion in this section is restricted to the cooling case only. However, it will be appreciated that a similar optimisation process is possible with models incorporating heating.

Consider, for example, a weather forecast given by $T_{amb} = \{T_{amb}(1), \ldots, T_{amb}(k)\}$. Consider also that a cooling power profile for the building is chosen, which is given by $P_{cool}=\{P_{cool}(1), \ldots, P_{cool}(k)\}$. It is possible to feed these two time series into filter equations (12) to (17) to obtain filtered versions, from which it is possible to obtain the internal building temperature via Equation (18): $T_{int}=\{T_{int}(1), \ldots, T_{int}(k)\}$.

Having $P_{cool}$ and $T_{int}$ provides for assessing whether the chosen power profile $P_{cool}$ performs well or not. Specifically, one can look at the cost of energy consumption and $CO_2$ emissions (based on $P_{cool}$), as well as the impact on occupant comfort (based on $T_{int}$).

The dollar cost of energy consumption of this embodiment is given by the following:

$$C_\$ = \sum_{i=1}^{K} \text{Tariff}(t_k) * P_{cool}(k) \qquad (32)$$

where $\text{Tariff}(t_k)$ represents the energy tariff at the time corresponding to sample k.

The cost of $CO_2$ emissions is given by:

$$C_{CO_2} = \sum_{i=1}^{K} P_{cool}(k) \qquad (33)$$

It is also possible to impose a cost on deviations from a predetermined target average comfort level, as follows:

$$C_{comf}(PPD_{target}) = \sum_{i=1}^{K} |PPD(T_{int}(k)) - PPD_{target}|^2 \qquad (34)$$

We can combine these three cost components into a single cost function:

$$C(P_{cool}|T_{amb}) = w_1 C_\$ + w_2 C_{CO_2} + C_{comf}(PPD_{target}) \qquad (35)$$

In Equation (35), the three parameters $w_1$, $w_2$ and $PPD_{target}$ are user configurable. The $P_{cool}$ parameter in $C(P_{cool}|T_{amb})$ is there to emphasize that, for a given ambient temperature forecast, the entire cost function depends only on the chosen power profile.

The cost function allows one to find an optimal power profile using standard optimization. Of course, alternative or modified cost functions can also be utilised.

Alternative Model Including Heating

One form of extension of the previous models to also include heating optimizations will now be described. The extension allows for additional building operation types, heating and fuel source mixes, and in alternative optimisation and modelling methods. The models can be extended to allow for the identification of the effect of heat energy, electric and non-electric fuel sources, and mixed heating and cooling situations on the energy consumption, comfort levels and CO2 emissions of a building.

The alternative model has been designed for testing against a building having a conventional gas boiler heating system, hot and chilled water loops and VAVs. Of course, customization to any particular building should also be carried out. The example building for which the model was developed was located in Victoria, Australia and had the following characteristics: Construction: Blockwork, built 2006; Floor area: 1808 m2, 3 levels, offices, Operation: Mixed mode—natural ventilation with fans, automatic windows, Heating: Raypak 868 gas boiler—868 kWth (link), Cooling: York YCA 0235 6-stage Air-Cooled Scroll Chiller—235 kWth nominal (link); BMS: Siemens Desigo v3.0, Siemens BACNet Server; Metering: Gas volume meter, electrical submetering—mechanical services & whole building.

This alternative model provides for extending the structure of the building energy model to allow learning of the effect of both heating and cooling on zone temperature. The model also allows for optimization of the consumption of both heating and cooling energy. The model also deals with non-electric fuel sources. This includes consideration of capacity, pricing structures and greenhouse gas emissions. The model also allows for dealing with multiple, possibly simultaneous, energy sources.

The previous cooling only models were designed towards buildings operating in warm climates where HVAC energy consumption is dominated by cooling. While cooling is almost exclusively achieved using electric chillers, there are a number of different systems and fuel types commonly used to deliver heating. Additionally, multiple different systems may be installed and even run simultaneously on single building—significantly complicating the implementation.

Although buildings may have multiple heating/cooling systems, with substantial flexibility in determining which to use under given conditions, the approach used with this alternative model is to allow the existing BMS to determine the appropriate combination of plant to use to affect a given conditioning setpoint. At a high level, this alternative model learns the relationship between energy greenhouse gases and building conditions and applies optimised zone condition setpoints. At a low level, this alternative model can be used to lock out or use certain plant preferentially, though this is not part of the core optimisation. When low level changes are enacted, this alternative model sees these through changes in condition/energy relationships and updates the building model accordingly.

Zone Level Heating/Cooling Control

The initially discussed model, used a zone level PMV setpoint at the key control variable. For this cooling dominated case, heating was carried out using a rule based approach (heat to a minimum acceptable comfort level and no further), and the PMV setpoint was interpreted as the targeted level of cooling. The individual zone control algorithm was essentially: If $T_{Zone} < T_{Min\_Allowed}$ then Heat_To_$T_{Min}$ else Cool_To_PMV_Setpoint end Exactly how these heating/cooling setpoints were realised, was then dependant on the specific BMS and building configuration—including control of supply air setpoints, chilled & hot water valves, etc. It is important that this low level BMS interface ensures that energy is not wasted cooling below the cooling setpoint, or heating above the heating setpoint (for example having electric reheats come on when zone setpoint is raised with the intent of reducing cooling power). In order to allow both heating and cooling to be optimised, while minimising the possibility of simultaneous heating/cooling (which for adjacent zones can be very energy wasteful), the high level building optimisation of the alternative model is modified to produce two setpoints—a cooling setpoint PMV and a heating setpoint PMV. The basic individual zone control algorithm is then modified to essentially implement: If $PMV_{Zone} < PMV_{Heat\_setpoint}$ then Heat_To_

$PMV_{Heat\_Setpoint}$ else $Cool\_TO\_PMV_{cool\_Setpoint}$ end which is essentially the same as previously, however both heating and cooling setpoints are both expressed in PMV and vary dynamically per the optimisation. This requires minimal changes to the low level zone controller.

To facilitate the inclusion of heating, cooling and different fuel sources, the structure of the 'grey box' building model was revised. An updated formulation was as follows:

$$T_z = F_A(s) \cdot T_{Amb} + \text{BaselineFcn} - F_T(s) \cdot \Delta T_{SS}$$

where: $T_z$ is (modelled) aggregate zone temperature; $T_{Amb}$ is the outside (Ambient) air temperature; $\Delta T_{SS}$ is the steady state difference in zone temperature that would result from the current HVAC cooling and heating powers; BaselineFcn is a learnt function of time, accounting for people, equipment, sun, etc; $F_A(s)$ and $F_T(s)$ are linear time invariant filters, accounting for the system dynamics. Furthermore, we denote:

$$T_{ZF} = F_A(s) \cdot T_{Amb} + \text{BaselineFcn}$$

as the (modelled) free-running zone temperature—that is, our estimate of what the aggregate building zone temperature would have been without the HVAC system running; and $$\Delta T_Z = F_T(s) \cdot \Delta T_{SS}$$

as the difference in zone temperature due to the HVAC system.

The filters $F(s)$, were, and remain $3^{rd}$ order LTI with feed-through and time constants at 1, 2 and 5 hours. Specifically:

$$F_T(s) = k_{T\_0} + \frac{k_{T\_1}}{\tau_1 \cdot s + 1} + \frac{k_{T\_2}}{\tau_2 \cdot s + 1} + \frac{k_{T\_3}}{\tau_5 \cdot s + 1};$$

and $$F_A(s) = k_{A\_0} + \frac{k_{A\_1}}{\tau_1 \cdot s + 1} + \frac{k_{A\_2}}{\tau_2 \cdot s + 1} + \frac{k_{A\_3}}{\tau_5 \cdot s + 1}$$

where $k_{T\_0}, k_{T\_1}, k_{T\_2}, k_{T\_3}, k_{A\_0}, k_{A\_1}, k_{A\_2}$ & $k_{A\_3}$ are filter gains that are identified, and $\tau_1, \tau_2$ & $\tau_5$ are the 1, 2 & 5 hour time constants respectively.

The BaselineFcn is represented by two vectors, BaselineWeekday and BaselineWeekend, each of dimension 1×12 which are interpreted as the offset temperatures (in °C.) that are added to the modelled average zone temperature at times [0 2 4 8 10 12 14 16 18 20 22] hours into the (week or weekend) day. When calculating the appropriate BaselineFcn value at other times, a linearly interpolation can be undertaken between the two nearest values. One difference in the alternative model is that the normalised HVAC cooling power has now been replaced with $\Delta T_{SS}$—which represents the aggregate impact of multiple heating/cooling sources on the zone temperatures.

Heating/Cooling Power relationships

While the previous models were aimed at cooling dominated scenarios, in order to handle the heating case, an alternative power model structure is desired. Core factors include: where diversity between zones mean that although the aggregate zone temperature might be at setpoint, both heating and cooling energy need to be used to maintain individual zones at a setpoint; rather than treating cooling and heating as being proportional to the applied HVAC power, it needs to be acknowledged that there are likely a number of reasonably fixed loads (ie fans & pumps) associated with the HVAC system running even before any notable cooling/heating is achieved. Some of this baseline may also be due to other site loads. Another factor is that efficiency of heating/cooling systems changing with ambient temperature—a specific example being the decrease in COP (coefficient of performance) of chillers with increasing ambient temperature. Increased use of external air in preference to running chillers/heaters (day-purge) also has this impact.

The following relationship between measured power and impact on aggregate zone temperature were utilised:

$$\Delta T_{SS} = \alpha_c \cdot \mu_c \cdot \max\{0, P_{cool} - P_{cb}\} - \alpha_h \cdot \mu_h \cdot \max\{0, P_{Heat} - P_{hb}\}$$

where the first part of the equation is the effective cooling temperature ($\Delta T_{Cool}$), the second part is the effective heating temperature ($\Delta T_{Heat}$), and the parameters are: $P_{Cool}$ and $P_{Heat}$ are actual cooling and heating powers respectively (kW); $P_{cb}$ and $P_{hb}$ are baseline cooling and heating powers respectively (kW); $\alpha_c$ and $\alpha_h$ are nominal scaling for HVAC power effectiveness (° C./kW); and $\mu_c$ and $\mu_h$ are HVAC efficiency de-ratings as a function of external temperature.

The de-ratings are parameterised as:

$$\mu_c = \min\{1, 1 + \alpha_{cd}[T_{cx} - T_{Amb}]\};$$

and $$\mu_h = \min\{1, 1 - \alpha_{hd}[T_{hx} - T_{Amb}]\}.$$

$T_{cx}$ is the temperature above which cooling de-rating occurs, while $T_{hx}$ is the temperature below which heating de-rating occurs. Typical values might be 20° C. $\alpha_{cd}$ and $\alpha_{hd}$ are the de-rating fractions—typically around 0.02/° C.

Additionally, to emulate mixed heating/cooling scenarios, effective cooling is considered to occur for $\Delta T_{SS} > \Delta T_{c0}$ and heating for $\Delta T_{SS} < \Delta T_{h0}$. Typical values of these would be $\Delta T_{c0} = -0.5°$ C. and $\Delta T_{h0} = 0.5°$ C.—meaning that for $\Delta T_{SS}$ between −0.5 to 0.5° C., there would be a combination of both heating and cooling occurring.

Figure 12:
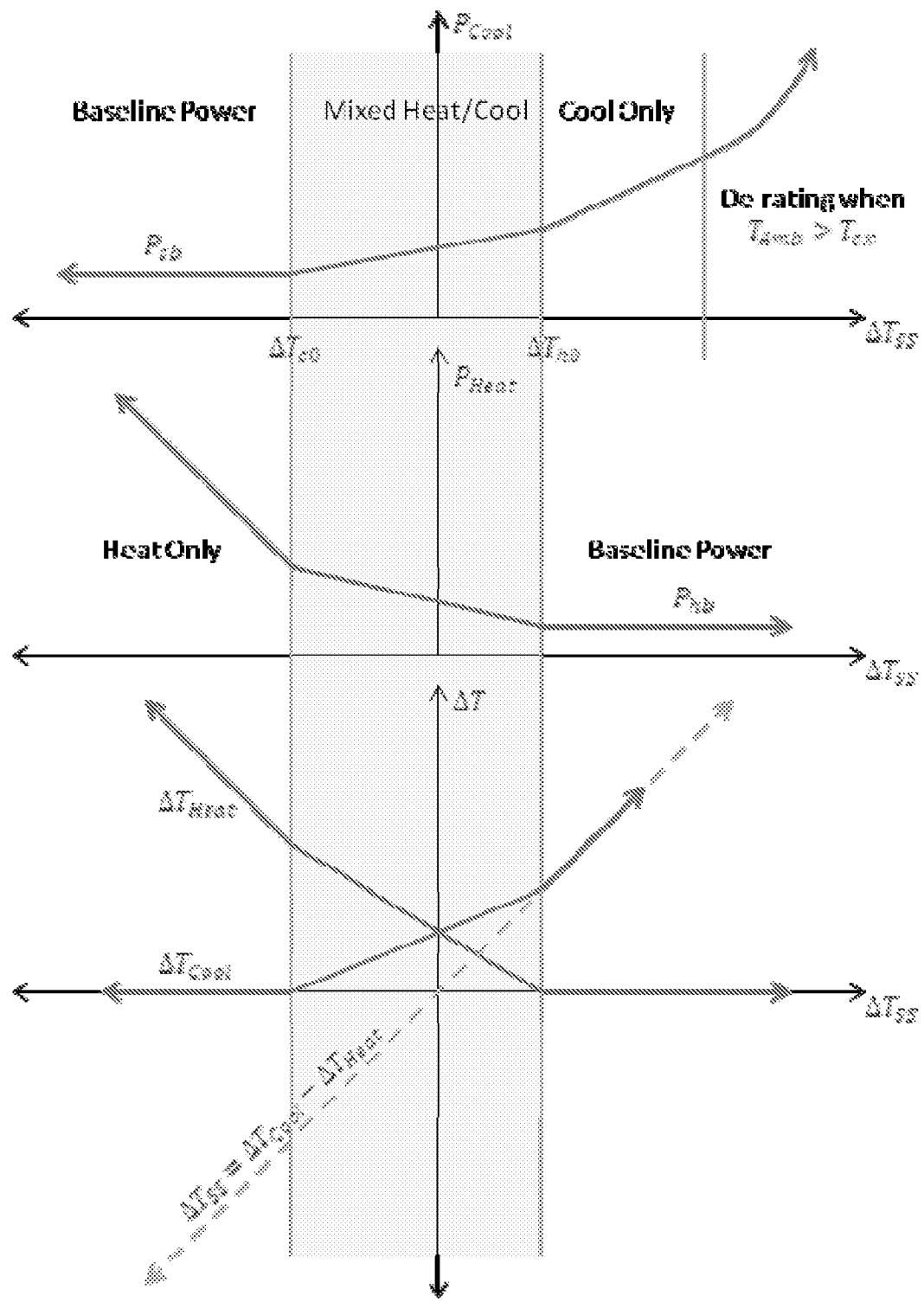
FIG. 12 illustrates an example of the relationship between heating and cooling power parameters.

FIG. 12 illustrates the interrelationship of these variables. The combined heating and cooling power now gives total building power that can match the 'V' or parabolic type relationship that we expect for building power as a function of external temperature.

Fitting to the Revised Building Model

In the revised model, fitting of the building model is performed once per day, as the system is restarted. Data from a building log file is read, and time series data is extracted for the signals: This data can include: $T_z$—the aggregate zone temperature, taken as a weighted average of all zone temperatures—based on a 'Config_ZoneSizes' configuration parameter; $P_{Cool}$—taken as a sum of all cooling related power measurements, as described below; $P_{Heat}$—taken as a sum of all heating related power measurements, as described below; and $T_{Amb}$—the measured ambient (outside) temperature.

Ideally these data sets should comprise 2-3 months continuous data. Where this is not the case, small data gaps can be interpolated over. Where there are large gaps in the data, the data can be broken into multiple sets and once the data is filtered the first 5 hours of each set is discarded to minimise the impact of unknown initial conditions.

The assessment of model fit is based on 2-norm—that is, model parameters are chosen within allowable ranges to minimise $\int(T_z-\tilde{T}_z)^2 \, dt$, the squared error between the modelled and measured aggregate building zone temperature.

The model fit can be programmed as a nested optimisation:

$$\min_{PowerParameters} \|T_z - \tilde{T}_z\|_2 \text{ where } \tilde{T}_z : \left\{ \min_{FilterParameters} \|T_z - \tilde{T}_z\|_2 \Big|_{PowerParameters} \right\}$$

with PowerParameters are $P_{cb}$, $P_{hb}$, $\alpha_c$, $\alpha_h$, $\mu_c$, $\mu_h$, $\alpha_{cd}$ and $\alpha_{nd}$; FilterParameters are $k_{T\_0}$, $k_{T\_1}$, $k_{T\_2}$, $k_{T\_3}$, $k_{A\_0}$, $k_{A\_1}$, $k_{A\_2}$, $k_{A\_3}$, Baseline Weekday and Baseline Weekend; and as a final step $\Delta T_{c0}$ and $\Delta T_{h0}$ are fitted based on the learned model.

In implementing this model fit, the Matlab lsqlin function (least squares with linear constraints) can be used for fitting the FilterParameters, while fminc on (multidimensional constrained nonlinear minimisation) can be used for the PowerParameters search. The model was broken up this way to reduce the dimension of the required nonlinear minimisation—which is a harder problem than the linear case. The model fitting routine has been updated so that rather than having limits of these parameter values hard coded into the routine, these are now passed in, as upper and lower bounds for each parameter. If a parameter is not to be fitted, these upper and lower bounds can be set equal.

Optimising Building Setpoints with the Revised Building Model

In the alternative model, the methodology for the building setpoint optimisation can be revised to take into account the heating case. Previously, the optimisation returned an optimised power profile for the building, which was then used to determine appropriate PMV setpoints for each zone while tracking this profile. In the alternative model, the revised optimisation explicitly provides dual heating and cooling target PMV setpoints in addition to both expected heating and cooling powers. The PMV setpoints are now treated as the primary optimised setpoints, and are only relaxed if anticipated power usage is being exceeded. This, and a revised approach to initial conditions calculation, helps overcome some of the sensitivity to fluctuations in the power measurements—unless anticipated power usage is exceeded, the building will operate on PMV setpoints.

The dual PMV setpoints are derived through a similar optimisation process as previously, however $\Delta T_{SS}$ is now the optimised variable rather than cooling power. From $\Delta T_{SS}$, anticipated heating/cooling power is determined from the nonlinear maps, allowing calculation of power cost, greenhouse gas cost and PMV. From the optimised PMV, the dual PMV setpoints are given as $$PMV_{Cool} = \begin{cases} PMV_{Opt}; & \Delta T_{ss} \geq 0 \text{ (Cooling)} \\ PMV_{Cool\_Min}; & \text{otherwise} \end{cases}$$

$$PMV_{Heat} = \begin{cases} PMV_{Opt}; & \Delta T_{ss} < 0 \text{ (Heating)} \\ PMV_{Heat\_Max}; & \text{otherwise} \end{cases}$$

that is, when the building is in aggregate heating, any zones that need cooling should only be cooled to the minimum acceptable PMV (noting PMV scale goes from −3:Cold to 3:Hot), while zones being heated should target the optimised PMV setpoint. Similar formulations can be implemented for the cooling mode.

The setpoint optimisation runs each 5 minutes based on updated information on: Actual Building Zone temperatures; Energy Prices; amd Weather forecasts. These are used in conjunction with the previously determined building model, which gives the expected relationship between heating and cooling powers and building thermal condition:

$$\tilde{T}_z = F_A(s) \cdot T_{Amb} + \text{Baseline} Fcn - F_T(s) \cdot \Delta T_{SS}$$

The optimisation seeks to minimise:

$$J(\Delta T_{SS}) = W_{CO2} \cdot CO2 + W_{Cost} \cdot \text{Cost}; \text{ s.t. average PPD} \leq Av_{PPD}$$

where: CO2 is the estimated $CO_2$ impact of the proposed run schedule for the remainder of the day; Cost is the estimated monetary costs of the proposed run schedule for the remainder of the day; average PPD is the estimated average PPD achieved for the whole of the day; $W_{CO2}$ & $W_{Cost}$ are (scalar) weights used to apportion the relative importance of these metrics to the optimisation; and $Av_{PPD}$ is the target maximum allowable average PPD for the building over the day.

Figure 13:
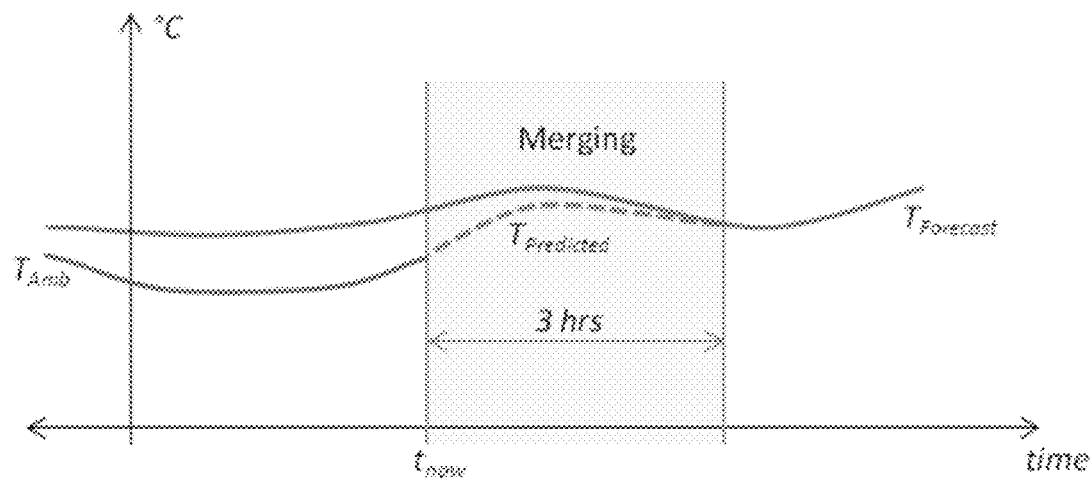
FIG. 13 illustrates the process of merging actual measured temperatures with forecast ambient temperatures.

In assessing this cost function, there is a static (nonlinear) map as described in the previous section between $\Delta T_{SS}$ and heating/cooling power—and hence energy & $CO_2$ costs. To assess the PMV and PPD profile for the remainder of the day, an estimate of the future weather conditions is required. From the BMS, we have a data history of $T_{Amb}$, and from the BOM (plus any localised weather learning algorithm), we have the forecast ambient temperature $T_{Forecast}$. These two data sets must be merged together so that there is not a discontinuity in the data. This merge of historic and forecast ambient temperature occurs over a 3 hour interval and the subsequent data set is denoted $T_{predicted}$. The merging process is illustrated in FIG. 13.

Dealing with Initial Conditions

The previous models relied upon measured cooling power and ambient temperature to initialise model dynamics. This could cause problems where measured power was significantly different from the anticipated modelled power (for example due to compressor staging) or where the building dynamics and loads (usage pattern) were significantly different from those modelled. This can manifested itself as a discontinuity between measured behaviour (up to current time) and the forecast behaviour moving forward. To help overcome this and remove as much dependency on the power modelling, the optimization can use a state 'estimator' (observer) to model the building dynamic state—and provide a free running response. This allows the optimisation routine to only need deal with a zero-initial-condition case in calculating the building response to the proposed $\Delta T_{SS}$.

The estimated conditioning is obtained by rearranging the building model:

$$\widetilde{\Delta T}_{SS} = F_T^{-1}(s)[F_A(s) \cdot T_{Amb} + \text{Baseline} Fcn - T_z];$$

up until time $t_{now}$, and the free-running building response (no HVAC) is obtained by setting $\widetilde{\Delta T}_{SS} = 0$ for time greater than $t_{now}$ and calculating:

$$\tilde{T}_{ZF} = F_A(s) \cdot T_{Amb} + \text{Baseline} Fcn - F_T(s) \cdot \widetilde{\Delta T}_{SS}$$

and the controlled building aggregate zone temperature response is then given by:

$$\widetilde{T}_{ZF} = F_A(s) \cdot T_{Amb} + \text{Baseline} Fcn - F_T(s) \cdot \widetilde{\Delta T}_{SS} - F_T(s) \cdot \Delta T_{SS}$$

where $F_T(s) \cdot \Delta T_{SS}$ is the optimised zero initial condition response for time $> t_{now}$ and the other filter dynamics have been allowed to evolve over the previous day data to have appropriate state at time $t_{now}$.

Catering for Different Fuel Types

The alternative model is also able to deal with different fuel types. The main issues here are: Different fuel types have different greenhouse gas potentials; different fuel types have different pricing structures; and different measurement methods are used to monitor fuel usage.

In Australia, the relative impacts of different energy sources are calculated by the Australian Government—Depattnient of Climate Change and Energy Efficiency (DC-CEE). Each year these figures are updated and published as the 'National Greenhouse Accounts (NGA) Factors' [1]. The factors change depending on different mining methods, fuel mixes, distribution losses etc and consequently vary over both time and geographic location. In reporting greenhouse gas impacts, there are 3 different types of emission factors used: Scope 1 Emissions—these are the direct $CO_2$ equivalent emissions from an activity (for example, the $CO_2$ directly released in burning natural gas, ignoring what was involved in extracting/refining/transporting the gas); Scope 2 Emissions—these are the indirect $CO_2$ equivalent emissions from the generation of electricity, purchased and consumed by an organisation, to conduct an activity (that is, the scope 1 emissions that a power station incurs on your behalf in generating electricity for you); Scope 3 Emissions—these are the various additional emissions associated with extraction, production, transport, generation, distribution/transmission etc of a fuel. This includes electrical network losses. An assessment of the full fuel cycle costs include Scope 3 emissions.

Figure 14:
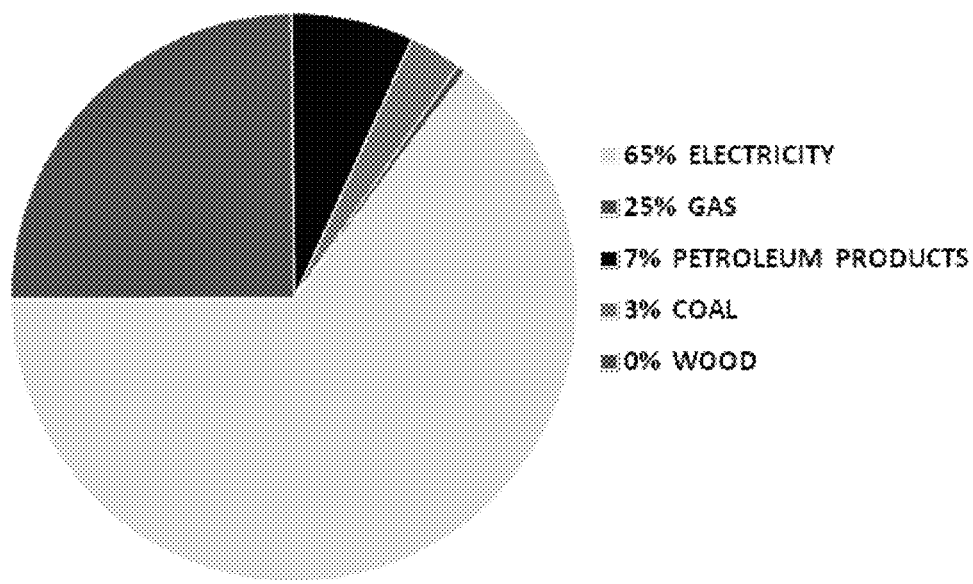
FIG. 14 illustrates different fuel use by type for Australian Commercial Buildings.

For the commercial building sector, the relative proportions of different fuel types used, as reported as used in Australian commercial buildings are shown below in FIG. 14. This is (unsurprisingly) dominated by the use of electricity and natural gas. Latest estimates (per July 2010, from [1]) of the full fuel cycle of these fuels in Australia are set out in the following table (noting that 1 MWh=3.6 GJ):

|  | Natural Gas (metro) $kgCO_2$-e/GJ | | | Electricity | | |
|---|---|---|---|---|---|---|
|  |  |  | Full | $kgCO_2$-e/GJ ($kgCO2$-e/kWh) | | |
|  | Scope 1 | Scope 3 | Cycle | Scope 2 | Scope 3 | Full Cycle |
| NSW | 51.33 | 14.2 | 65.53 | 249 (0.9) | 48 (0.17) | 298 (1.07) |
| Vic | 51.33 | 4.0 | 55.33 | 342 (1.23) | 39 (0.14) | 382 (1.37) |
| Qld | 51.33 | 8.6 | 59.93 | 247 (0.89) | 36 (0.13) | 283 (1.02) |
| SA | 51.33 | 10.4 | 61.73 | 200 (0.72) | 37 (0.13) | 236 (0.85) |
| WA (SWIS) | 51.33 | 4.0 | 55.33 | 228 (0.82) | 29 (0.1) | 257 (0.93) |
| Tas | 51.33 | NA | NA | 89 (0.32) | 8 (0.03) | 96 (0.35) |
| NT | 51.33 | NA | NA | 189 (0.68) | 26 (0.09) | 215 (0.77) |

Configuration Changes to Cater for Different Fuel Types and Measurement Methods

The previous models only effectively handle one type of power measurement—electrical kW, contributing to cooling. In the alternative model, this is updated by the inclusion of configuration parameters.

The alternative model includes 5 configuration variables:

| Config_PowerWeights | 1 | 0.72 | 278 |
| Config_CarbonWeights | 1.07 | 1.07 | 0.236 |
| Config_PowerTypes | CP | CP | HE |
| Config_PowerPrices | 1 | 1 | 2 |
| Config_PowerPriceNames | 'Elec' | 'TOU' | 'Gas' |

Although many types of normalisation could be used, scaling factors need to provide a mechanism for comparing the relative effect of different fuel and measurement types. The scaling factors have been nominally considered to convert the measured quantities into kW (or kWh) for comparing power, and $kgCO_2$-e/kWh for comparing greenhouse impact. The PowerWeights configuration variable scales to kW (or kWh). The CarbonWeights variables scales to $kgCO_2$-e. The PowerTypes variable classifies each power measurement as either contributing to cooling (C) or heating (H), and then of measurement type power (P) or energy (E). A power measurement is (for example) a direct kW measurement. An energy measurement is through a cumulative register, ie kWh, and must be differentiated with respect to time to determine a power level. Valid values for PowerTypes are 'CP', 'CE', 'HP' and 'HE'. PowerPriceNames holds the names of different energy pricing configurations. PowerPrices provides an index into PowerPriceNames to determine which energy pricing structure applies to each power measurement.

For the specific configuration values in the example above, there are 3 measured power data points. These will be named Power$_{-1}$, Power$_{-2}$ and Power$_{-3}$ in the building configuration file. Power$_{-1}$ is measured directly in kW, so PowerWeights=1. The scaling factor to $CO_2$-e is 1.07 (for NSW). This energy is used for cooling with power being directly measured 'CP'. The energy pricing type is 'Elec TOU' hence index 1 into PowerPriceNames. Power$_{-2}$ is obtained by measuring amps on 1 phase of a balanced 3 phase system—hence PowerWeights is set to 0.72 since 1 measured amp corresponds to 720 W power. Other scaling factors are same as Power$_{-1}$. Power$_{-3}$ is gas for heating. It is measured using an accumulation meter with units GJ. PowerWeights of 278 converts GJ to equivalent kWh. CarbonWeights of 0.236 is the $kgCO_2$-e that one kWh equivalent of natural gas consumption equates to. PowerPrices is 2, being the index into PowerPriceNames for the Gas price structure.

Figure 15:
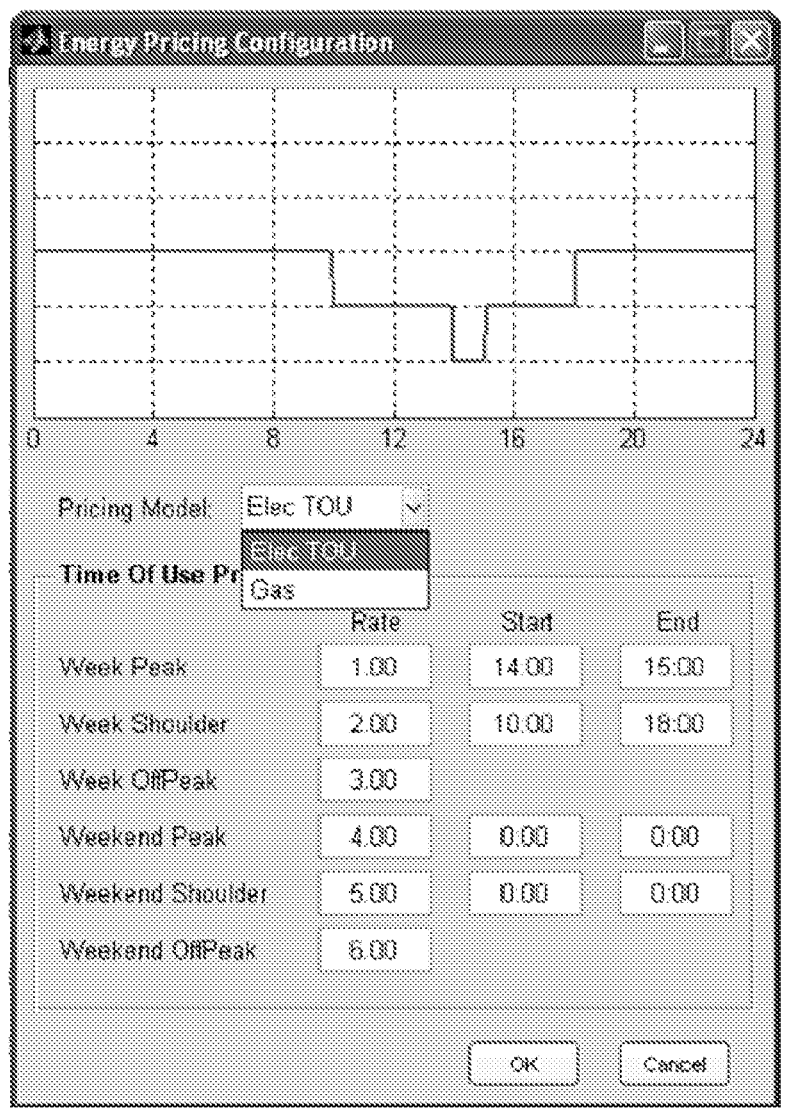
FIG. 15 illustrates an example graphical user interface for fuel price specification.

Although the names of the various power pricing structures are stored in the configuration file, the actual configuration of the pricing levels is done through the 'Energy pricing Configuration' GUI, which has been updated to allow for multiple fuel types (see EnergyPriceConfigV2.m). This allows a TOU pricing structure to be set for each fuel type—which can just be a fixed constant price, such as for gas. FIG. 15 illustrates and updated GUI for data entry. Units are nominally taken as c/kWh, though this is of course arbitrary.

REFERENCES

Australian Greenhouse Office (1999), Australian Commercial Building Sector Greenhouse Gas Emissions 1990-2010. Available online at http://www.environment.gov.au/ [Accessed 17 Jun. 2008]

Braun, J. E. (1990), Reducing Energy Costs and Peak Electrical Demand Through Optimal Control of Building Thermal Storage, ASHRAE Trans. Vol 96(2), pp. 876-888

Braun, J. E., Montgomery, K. W. and Chaturvedi, N. (2001), Evaluating the performance of building thermal mass control strategies. HVAC&R Research. Vol 7(4) pp 403-428.

Eto, J. (2007), Demand Response Spinning Reserve Demonstration. Ernest Orlando Lawrence Berkeley National Laboratory. Berkeley Calif., USA. http://eetd.lbl.gov/ea/EMS/EMS_pubs.html [Accessed 17 Jun. 2008]

Wanger, P. O. (1967), Calculation of thermal comfort: introduction of a basic comfort equation. ASHRAE Transactions 73(2):III.4.1.

Seppänen, O., Fisk, W. J. and Lei, Q. H. (2006), Room temperature and productivity in office work, Lawrence Berkeley National Laboratory, University of California. http://repositories.cdlib.org/lbnl/LBNL-60952 [Accessed 17 Jun. 2008]

White, S. and Ward, J. K. (2006), Performance of a Microturbine Power and Desiccant Cooling Demonstration. IIR-IRHACE International Conference 2006. Auckland, New Zealand. 16-18 Feb. 2006.

Burress, C. (2008), State abandons plan to allow utilities to control home thermostats, San Francisco Chronicle, Jan. 17, 2008. [Online]. Available: http://www.sfgate.com [Accessed May 1, 2008].

Australian Government Depat ment of Climate Change (2008), National Greenhouse Accounts (NGA) Factors. http://www.climatechange.gov.au [Accessed 17 Jun. 2008]

ASHRAE (2004), ANSI/ASHRAE Standard 55-2004, Thermal Environmental Conditions for Human Occupancy. American Society of Heating, Refrigerating and Air-Conditioning Engineers. Atlanta, USA. www.ashrae.org Brager, G., Paliaga, G. and de Dear, R. J. (2004), Operable windows, personal control and occupant comfort. ASHRAE Trans., Vol. 110(2), pp. 17-35.

Seppänen, O., Fisk, W. J. and Faulkner, D. (2003), Cost benefit analysis of the night-time ventilative cooling. Proceedings of the Healthy Buildings 2003 Conference. Singapore 2003, Vol 3 pp 394-399.

National Greenhouse Accounts (NGA) Factors. Department of Climate Change and Energy Efficiency, Commonwealth of Australia 2010. ISBN: 978-1-921299-04-9

INTERPRETATION

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Although the present invention has been described with particular reference to certain preferred embodiments thereof, variations and modifications of the present invention can be effected within the spirit and scope of the following claims.

We claim:

1. A method of controlling the heating, ventilation and air conditioning (HVAC) system of a building, the method comprising the steps of:
   (a) developing an initial thermal model of the building, and continuously updating this thermal model substantially daily;
   (b) utilising the thermal model to continuously develop a daily HVAC operating plan for the building wherein the daily HVAC operating plan includes the aggregate impact of multiple heating/cooling sources on a series of zone temperatures in said building, with the daily HVAC operating plan being recalculated substantially every 5 minutes; and
   (c) continuously examining a current HVAC operating plan and optimising the alignment of the current HVAC operation with the current HVAC operating plan substantially on the basis of seconds.

2. The method of claim 1, wherein said thermal model utilises a series of parameters, fitted to historical thermal data for the building.

3. The method of claim 1, wherein said thermal model is a piecewise polynomial model.

4. The method of claim 1, wherein said optimising the alignment of said current HVAC operation with the current HVAC operating plan is attempted substantially every 10 seconds.

5. The method of claim 1, wherein the thermal model has substantially the following form:

$$T_{int}(z) = F_{amb}(z)T_{amb}(z) - \frac{10}{P_{coolTyp}}F_{Pcool}(z)P_{cool}(z) + \frac{1}{P_{heatTyp}}F_{Pheat}(z)P_{heat}(z) + B(z)$$

Where:
   $T_{int}(z)$ is an average internal building temperature;
   $T_{amb}(z)$ is an ambient temperature;
   $P_{cool}(z)$ is a HVAC cooling power consumption;
   $P_{coolTyp}$ is a typical HVAC cooling power consumption;
   $P_{heat}(z)$ is a HVAC heating power consumption;
   $P_{heatTyp}$ is a typical HVAC heating power consumption;
   $F_{amb}(z)$ captures an internal building temperature response to the ambient temperature;
   $F_{Pcool}(z)$ captures an internal building temperature response to the HVAC cooling power consumption;
   $F_{Pheat}(z)$ captures an internal building temperature response to HVAC heating power consumption;
   $B(z)$ is a baseline fucntion and captures factors other than those captured by $F_{amb}(z)$, $F_{Pcool}(z)$ and $F_{Pheat}(z)$; and
   10 is a scaling factor.

6. The method of claim 5, wherein the baseline function changes depending on the day of the week.

7. The method of claim 6, wherein the baseline function is formed of a combination of triangular basis functions that are estimated at specific fixed points throughout a day.

8. The method of claim 1, wherein said optimising the alignment of the current HVAC operation with the current HVAC operating plan is attempted substantially in increments of seconds.

9. The method of claim 1, wherein the thermal model has substantially the following form:

$$\overline{T_z} = F_A(s) \cdot T_{Amb} + \text{BaselineFcn} - F_T(s) \cdot \Delta T_{SS}$$

where:
   $\overline{T_z}$ is a modelled aggregate zone temperature;
   $T_{Amb}$ is an outside ambient air temperature;
   $\Delta T_{ss}$ is a steady state difference in zone temperature that would result from the current HVAC cooling and heating powers;
   BaselineFcn is a learnt function of time, accounting for at least one of people, equipment, or sun;
   $F_A(s)$ and $F_T(s)$ are linear time invariant filters, accounting for system dynamics.

10. The method of claim 9, wherein $\Delta T_{ss}$ has the form of an equation:

$$\Delta T_{ss} = \alpha_c \cdot \mu_c \cdot \max\{0, P_{cool} - P_{cb}\} - \alpha_h \cdot \mu_h \cdot \max\{0, P_{Heat} - P_{hb}\}$$

where:
   the first part of the equation is an effective cooling temperature ($\Delta T_{cool}$);
   the second part of the equation is an effective heating temperature ($\Delta T_{Heat}$);
   $P_{cool}$ and $P_{Heat}$ are estimates of actual cooling power and actual heating power, respectively;
   $P_{cb}$ and $P_{hb}$ are baseline cooling power and actual heating power, respectively;
   $\alpha_c$ and $\alpha_h$ are nominal scaling for HVAC power effectiveness; and
   $\mu_c$ and $\mu_h$ are HVAC efficiency de-ratings as a function of external temperature.

* * * * *